(12) United States Patent
Ryu

(10) Patent No.: US 8,031,411 B2
(45) Date of Patent: Oct. 4, 2011

(54) TELEPHOTO ZOOM LENS

(75) Inventor: Jae-myung Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 12/473,411

(22) Filed: May 28, 2009

(65) Prior Publication Data

US 2009/0303596 A1    Dec. 10, 2009

(30) Foreign Application Priority Data

Jun. 5, 2008 (KR) .................. 10-2008-0053134

(51) Int. Cl.
*G02B 15/14* (2006.01)
*G02B 27/64* (2006.01)
(52) U.S. Cl. ......... 359/687; 359/557; 359/676; 359/686
(58) Field of Classification Search .......... 359/554–557, 359/676–690
See application file for complete search history.

(56) References Cited

U.S. PATENT DOCUMENTS

| | | | | |
|---|---|---|---|---|
| 4,398,807 | A * | 8/1983 | Iizuka ............... | 359/687 |
| 6,002,528 | A * | 12/1999 | Tomita ............... | 359/684 |
| 2006/0262422 | A1 * | 11/2006 | Ohashi ............... | 359/687 |

FOREIGN PATENT DOCUMENTS

| | | |
|---|---|---|
| JP | 2000-019398 A | 1/2000 |
| JP | 2001-356381 A | 12/2001 |
| JP | 2002-162564 A | 6/2002 |
| JP | 2003-090958 A | 3/2003 |
| JP | 2004-109559 A | 4/2004 |
| JP | 2007-212830 A | 8/2007 |

* cited by examiner

*Primary Examiner* — Thong Nguyen
(74) *Attorney, Agent, or Firm* — Drinker Biddle & Reath LLP

(57) ABSTRACT

A telephoto zoom lens having four lens groups in a P-N-P-P configuration arranged sequentially from an object side. The first lens group includes a front group which is fixed when focusing and has a positive refractive power, and a rear group which moves when focusing and has a positive refractive power. The entire first lens group, including the front and rear groups, is fixed during zooming, and the second and third lens groups move during zooming. The second lens group compensates for shaking of an image plane caused by hand-shaking, by moving in a direction perpendicular to the optical axis, and satisfies the following condition:

$$1.2 < f1a/f1b < 1.8$$

where f1*a* and f1*b* denote the focal length of the front group of the first lens group and the focal length of the rear group of the first lens group, respectively.

3 Claims, 48 Drawing Sheets

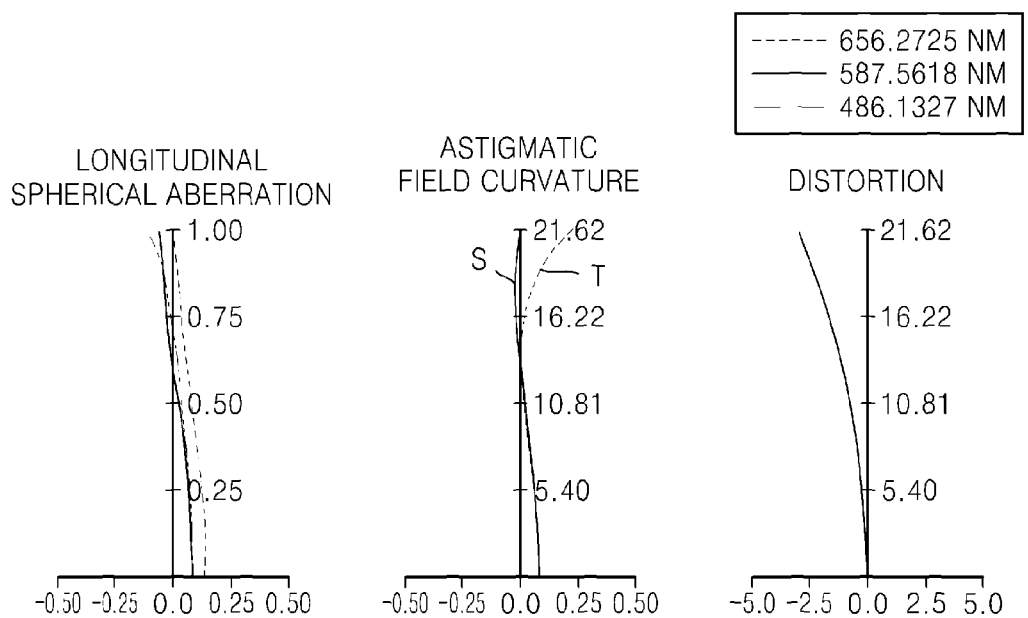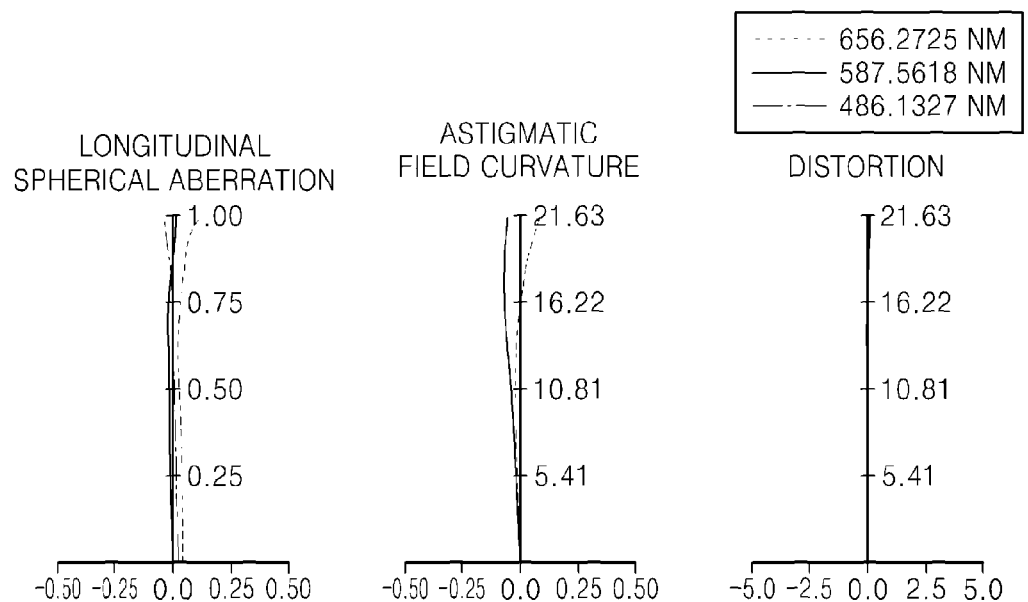

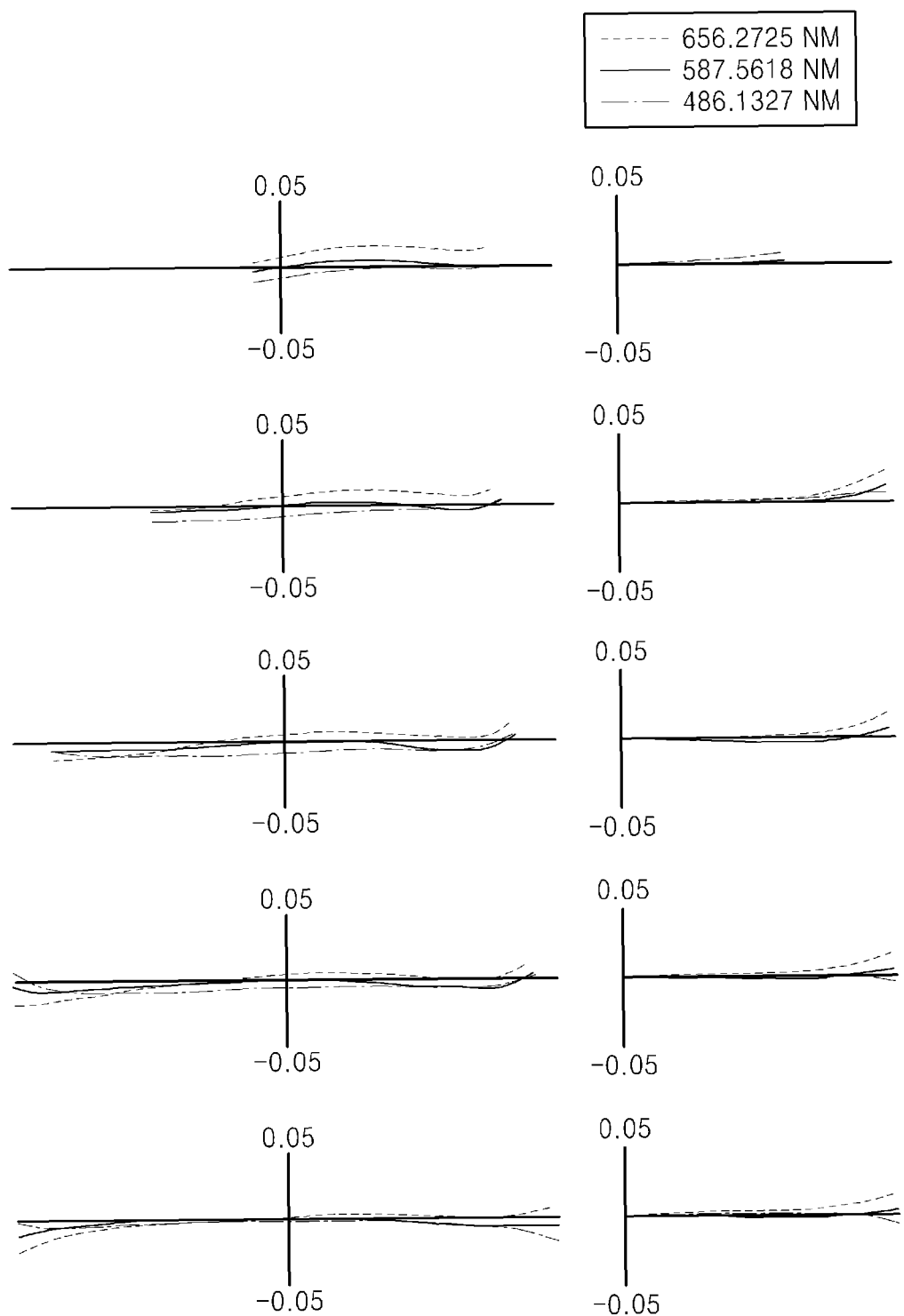

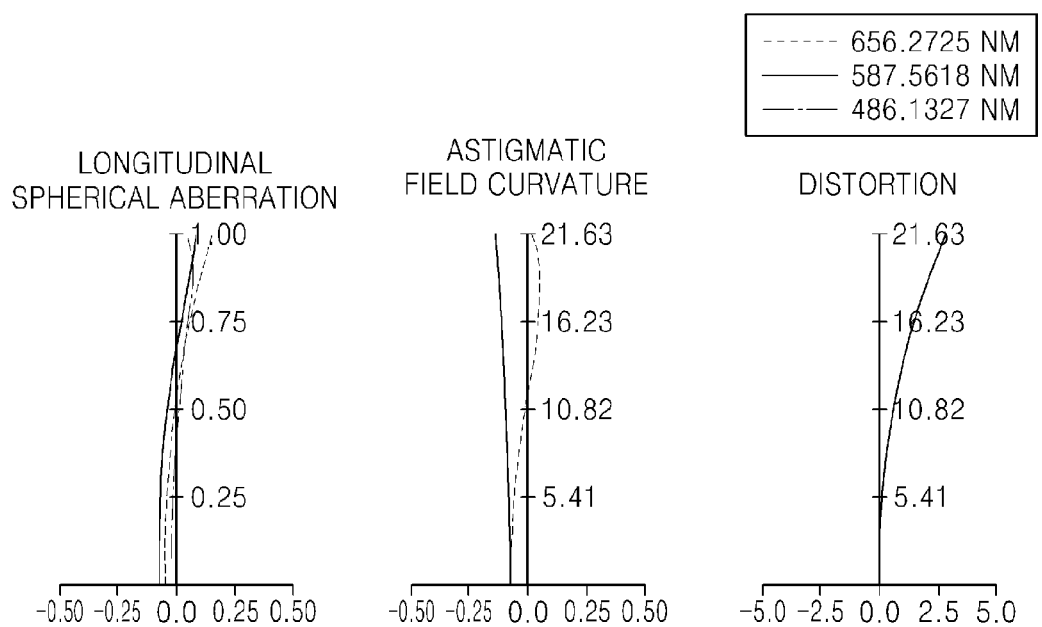

TELEPHOTO ZOOM LENS

CROSS-REFERENCE TO RELATED PATENT APPLICATION

This application claims the benefit of Korean Patent Application No. 10-2008-0053134, filed on Jun. 5, 2008, in the Korean Intellectual Property Office, the disclosure of which is incorporated herein in its entirety by reference.

BACKGROUND OF THE INVENTION

1. Field of the Invention

The present invention relates to a telephoto zoom lens that can compensate for hand-shaking.

2. Description of the Related Art

Digital cameras and video cameras that have imaging devices, such as charge coupled devices (CCDs) or complementary metal-oxide semiconductors (CMOSs), are widely in use. In particular, mega-pixel camera modules are in demand, and cameras having at least 5 million pixels and providing high definition are being developed as distribution type digital cameras. Optical imaging systems, such as digital cameras and cellular phone cameras that use imaging devices such as CCDs or CMOSs, are required to be compact, light, and cost-effective.

Demand for optical imaging systems having a high magnification is also increasing. Telephoto zoom lenses having a high magnification are able to take large pictures of subjects which are far away from the telephoto zoom lenses. However, zoom lenses having a high magnification are highly likely to result in poor images due to shaking of the device at a telephoto position. Due to vibration caused by slight hand-shaking occurring during photography or an image shake occurring during light emission of a flash, the quality of pictures may degrade. Since telephoto zoom lenses have a long focal length, a change in a viewing angle due to hand-shaking is large. Thus, devices with telephoto zoom lenses require hand-shaking compensation capabilities.

SUMMARY OF THE INVENTION

The present invention provides a telephoto zoom lens that can compensate for hand-shaking.

According to an aspect of the present invention, there is provided a telephoto zoom lens including a first lens group having a positive refractive power, a second lens group having a negative refractive power, a third lens group having a positive refractive power, and a fourth lens group having a positive refractive power which are sequentially arranged from an object side. The first lens group includes a front group which is fixed when focusing and has a positive refractive power, and a rear group which moves when focusing and has a positive refractive power. The entire first lens group including the front and rear groups is fixed when zooming, and the second and third lens groups move when zooming. The second lens group compensates for shaking of an image plane caused by hand-shaking, by moving in a direction perpendicular to the optical axis, and satisfies the following condition:

$$1.2 < f1a/f1b < 1.8$$

where f1a and f1b denote the focal length of the front group of the first lens group and the focal length of the rear group of the first lens group, respectively.

The second lens group may include four lenses, among which lenses positioned first and fourth from the object side have negative refractive powers and lenses positioned second and third from the object side have positive refractive powers.

According to another aspect of the present invention, there is provided a telephoto zoom lens including a first lens group having a positive refractive power, a second lens group comprising at least three lenses and having a negative refractive power, a third lens group having a positive refractive power, and a fourth lens group which are sequentially arranged from an object side. The first lens group includes a front group which is fixed when focusing and has a positive refractive power, and a rear group which moves when focusing and has a positive refractive power. The entire first lens group including the front and rear groups is fixed when zooming, and the second and third lens groups move when zooming. The second lens group compensates for shaking of an image plane caused by hand-shaking, by moving in a direction perpendicular to the optical axis, and satisfies the following condition:

$$0.5 < f2in/fT < 0.9$$

wherein f2in denotes the combined focal length of lenses positioned second and third in the second lens group from the object side, and fT denotes the overall focal length of the zoom lens at the telephoto position.

The first lens group may satisfy the following inequality:

$$25 < vmax - vmin < 40$$

wherein vmax denotes the largest Abbe number of the lenses included in the rear group of the first lens group, and vmin denotes the smallest Abbe number of the lenses included in the rear group of the first lens group.

BRIEF DESCRIPTION OF THE DRAWINGS

The above and other features and advantages of the present invention will become more apparent by the following detailed description of exemplary embodiments thereof with reference to the attached drawings in which:

FIGS. 2A through 2C illustrate aberrations at a wide angle position, an intermediate position, and a telephoto position of the zoom lens according to the embodiment illustrated in FIG. 1;

FIGS. 4A through 4C illustrate ray fans obtained by hand-shaking of the second lens group at the intermediate position of the zoom lens according to the embodiment illustrated in FIG. 1;

FIGS. 7A through 7C illustrate aberrations at a wide angle position, an intermediate position, and a telephoto position of the zoom lens according to the embodiment illustrated in FIG. 6;

DETAILED DESCRIPTION OF THE INVENTION

A telephoto zoom lens according to the present invention can be used in general cameras and video cameras, and is composed so that the overall length of a zoom lens optical system does not change according to focusing, in order to achieve high portability.

Figure 1:
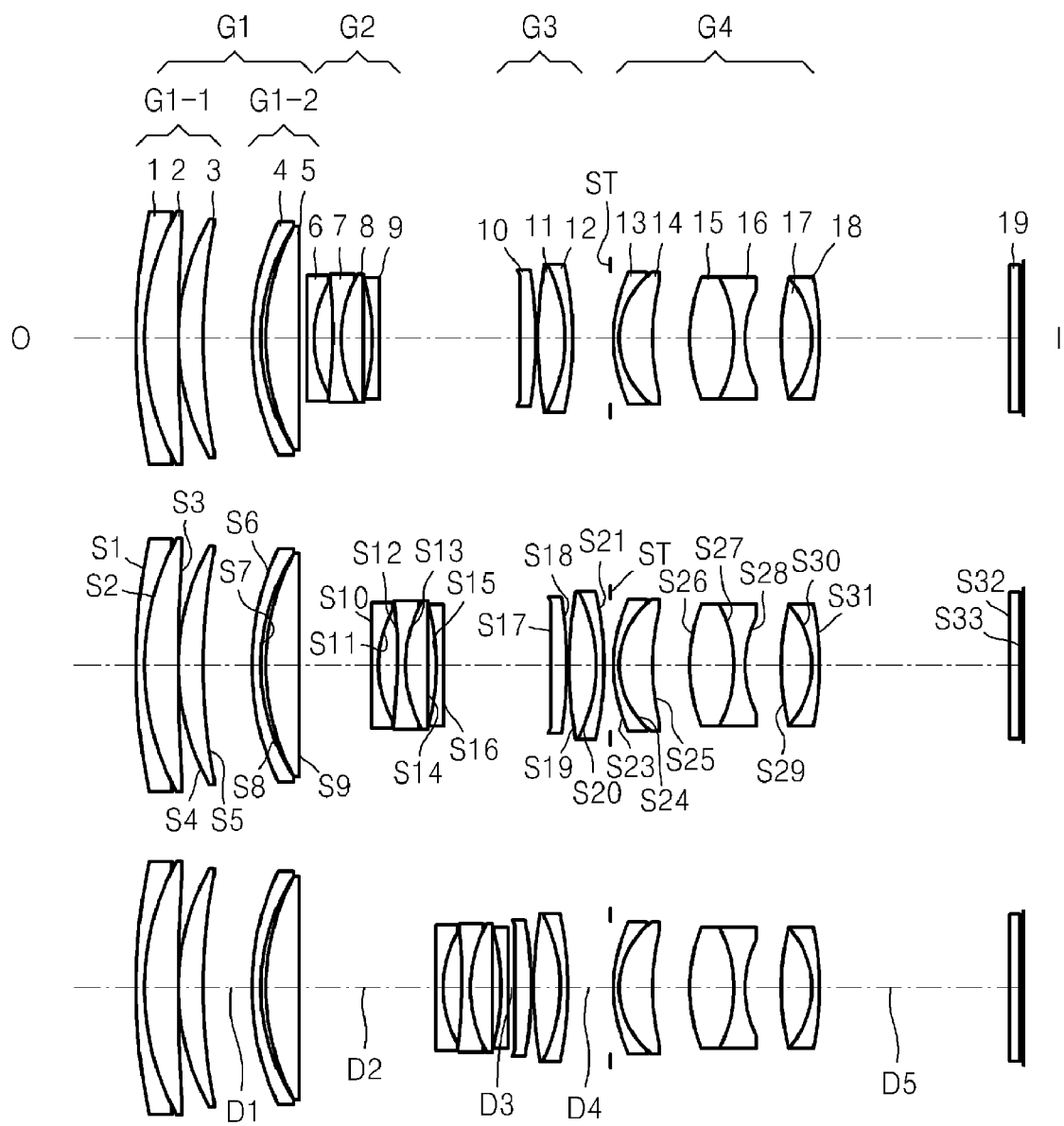
FIG. 1 illustrates a zoom lens according to an embodiment of the present invention, which shows a wide angle position, an intermediate position, and a telephoto position.

Referring to FIG. 1, a zoom lens according to an embodiment of the present invention includes a first lens group G1 having a positive refractive power, a second lens group G2 having a negative refractive power, a third lens group G3 having a positive refractive power, and a fourth lens group G4 having a positive refractive power, which are sequentially arranged from an object side.

The first lens group G1 includes a front group G1-1 which is fixed when focusing and has a positive refractive power, and a rear group G1-2 which moves when focusing and has a positive refractive power. When zooming from a wide angle position to a telephoto position, the entire first lens group G1 is fixed, the second and third lens groups G2 and G3 are moved, and the entire fourth lens group G4 or a part of the fourth lens group G4 is fixed or moves. More specifically, in embodiments illustrated in FIGS. 1, 11, and 16, the fourth lens group G4 is fixed when zooming. In the embodiment illustrated in FIG. 6, at least a part of the fourth lens group G4 moves when zooming. Here, the entire fourth lens group G4 may be moved, or a part of the fourth lens group G4 may be moved. Although designing the fourth lens group G4 to be fixed is desirable in the manufacture of an optical system, a part of the fourth lens group G4 or the entire fourth lens group G4 may be designed to move in order to increase the performance of the optical system.

Figure 6:
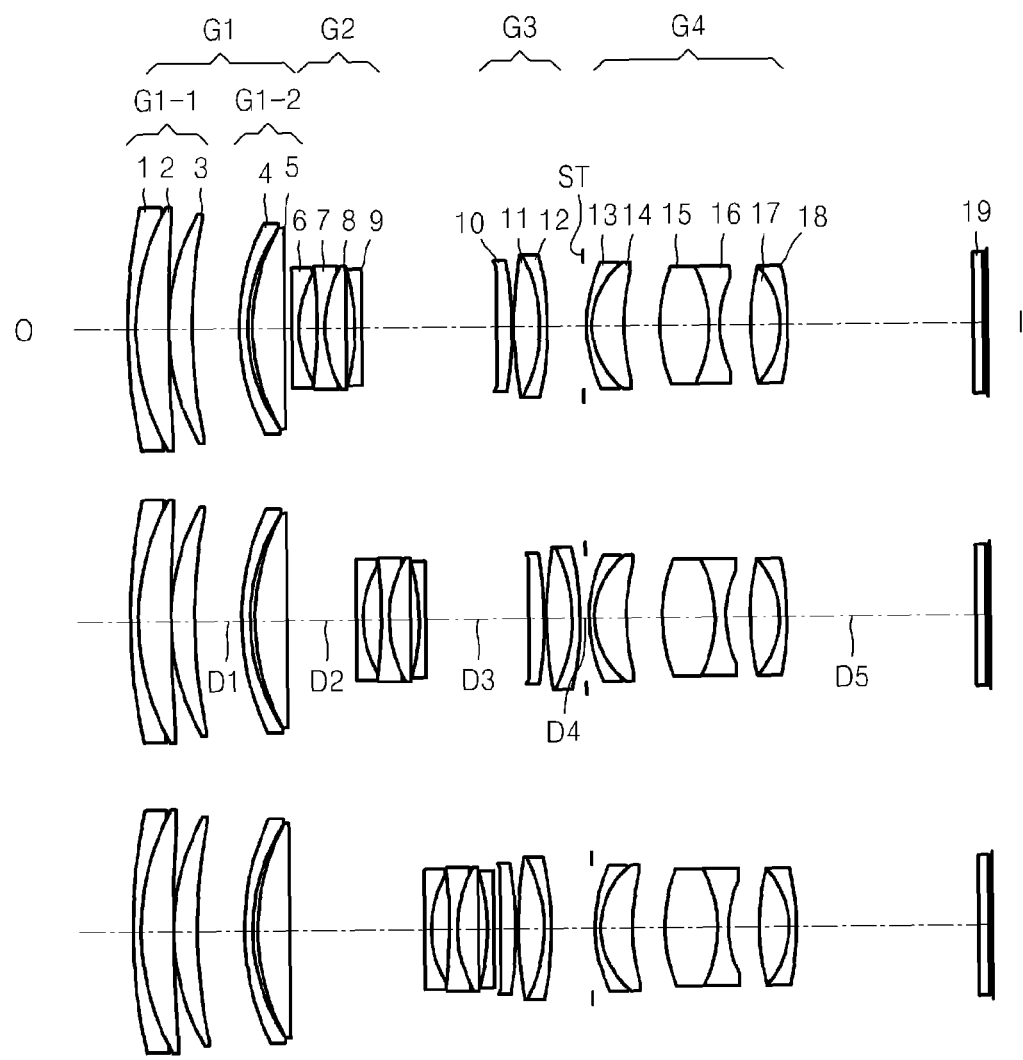
FIG. 6 illustrates a zoom lens according to another embodiment of the present invention, which shows a wide angle position, an intermediate position, and a telephoto position.
Figure 11:
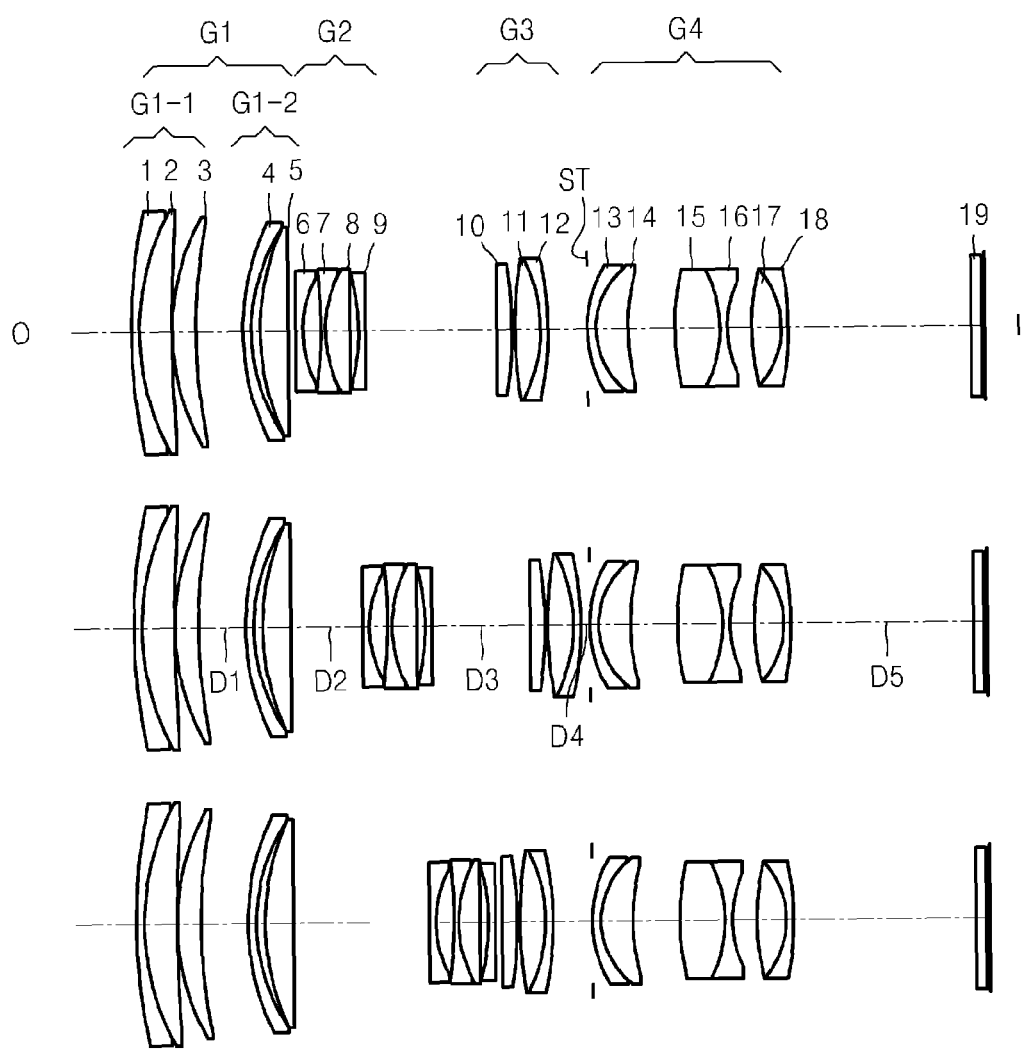
FIG. 11 illustrates a zoom lens according to another embodiment of the present invention, which shows a wide angle position, an intermediate position, and a telephoto position.

FIGS. 1, 6, and 11 illustrate zoom lenses according to different embodiments of the present invention. Referring to FIGS. 1, 6, and 11, the first lens group G1 includes the front group G1-1 which is fixed when focusing and the rear group G1-2 which moves when focusing. When the entire first lens group G1 performs a focusing operation, a movement amount of the first lens group G1 increases, and thus an effective aperture of the first lens group G1 may increase. The front group G1-1 includes first, second, and third lenses 1, 2, and 3, and the rear group G1-2 includes fourth and fifth lenses 4 and 5. The first and second lenses 1 and 2 may be doublet lenses. The second lens group G2 may include at least three lenses, for example, sixth, seventh, eighth, and ninth lenses 6, 7, 8, and 9, and the third lens group G3 includes tenth, eleventh, and twelfth lenses 10, 11, and 12. Since the second lens group G2, which performs zooming, is very sensitive, it is prone to generate a performance change according to the manufacture of the second lens group G2. When the second lens group G2 includes four lenses and the sixth and ninth lenses 6 and 9 have negative refractive powers, the seventh and eighth lenses 7 and 8 are designed to have positive refractive powers so as to correct color aberrations of the sixth and ninth lenses 6 and 9. When the second lens group G2 has a negative refractive power and the combined focal length of the lenses positioned second and third in the second lens group G2 from the object side O, namely, the seventh and eighth lenses 7 and 8, is too great, the focal length of the entire second lens group G2 is also increased, and thus the movement amount of the second lens group G2 increases during zooming. Accordingly, the combined focal length of the lenses positioned second and third in the second lens group G2 from the object side O need to be properly restricted. This will be described later. The fourth lens group G4 includes thirteenth, fourteenth, fifteenth, sixteenth, seventeenth, and eighteenth lenses 13, 14, 15, 16, 17, and 18. An aperture stop ST is provided on the object side O of the fourth lens group G4, and an infrared ray filter 19 is provided on the image side I of the fourth lens group G4.

Figure 16:
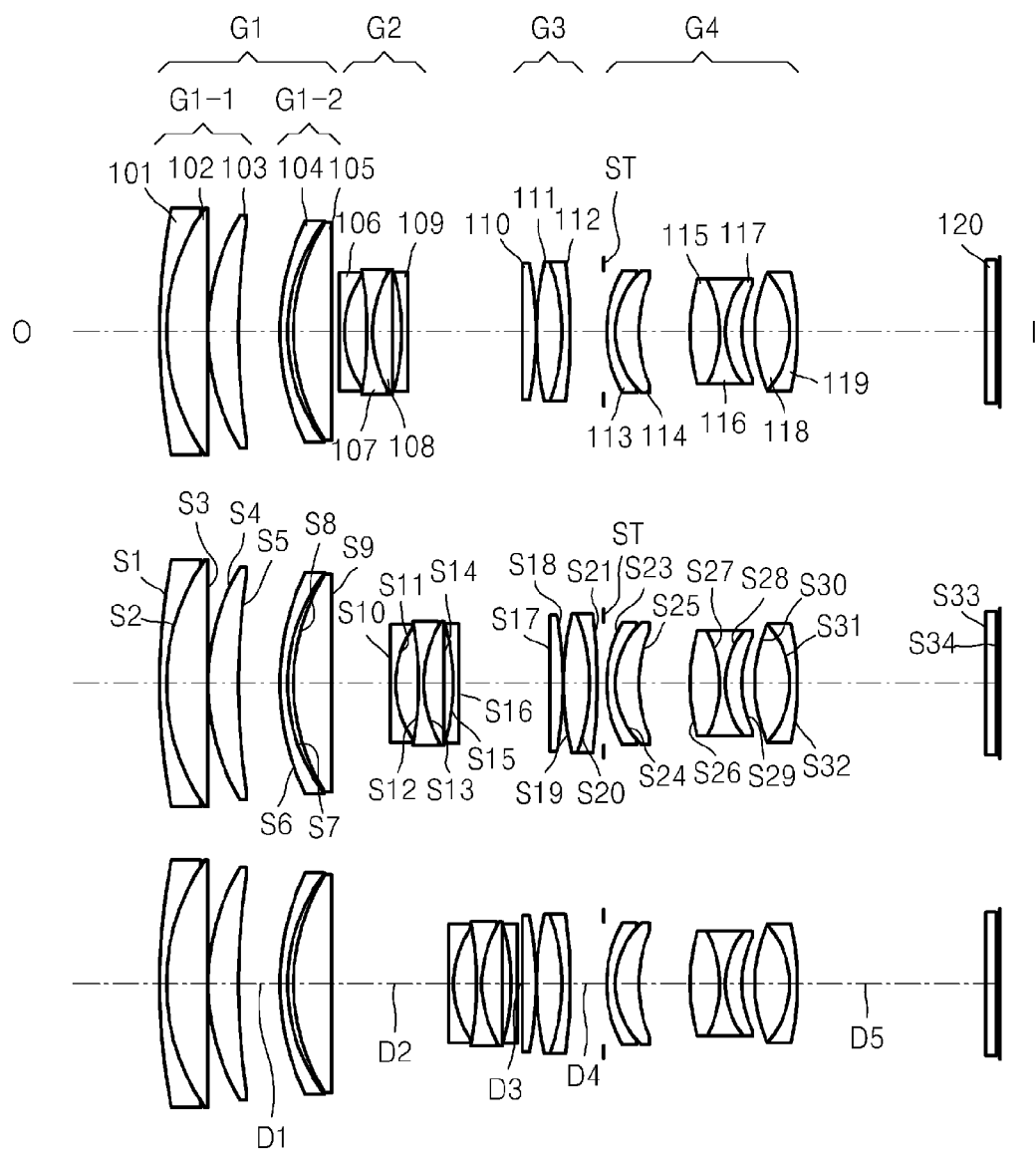
FIG. 16 illustrates a zoom lens according to another embodiment of the present invention, which shows a wide angle position, an intermediate position, and a telephoto position.

FIG. 16 illustrates a zoom lens according to another embodiment of the present invention, which includes first, second, third, and fourth lens groups G1, G2, G3, and G4. The first lens group G1 includes a front group G1-1 which is fixed during focusing, and a rear group G1-2 which moves during focusing. The front group G1-1 includes first, second, and third lenses 101, 102, and 103, and the rear group G1-2 includes fourth and fifth lenses 104 and 105. The second lens group G2 includes sixth, seventh, eighth, and ninth lenses 106, 107, 108, and 109, the third lens group G3 includes tenth, eleventh, and twelfth lenses 110, 111, and 112, and the fourth lens group G4 includes thirteenth, fourteenth, fifteenth, sixteenth, seventeenth, eighteenth, and nineteenth lenses 113, 114, 115, 116, 117, 118, and 119. An aperture stop ST may be provided on the object side O of the fourth lens group G4, and an infrared ray filter 120 is provided on the image side I of the fourth lens group G4.

In the present invention, the overall length of the zoom lens system is set to not change when focusing, in order to achieve high portability. In the present embodiment, if the entire first lens group G1 moved during focusing, the overall length of the zoom lens would, undesirably, change as well. Thus, the zoom lens is designed such that only the rear group G1-2 of the first lens group G1 moves during focusing, instead of moving the entire first lens group G1. In general, a lens group that performs focusing needs to have a short focal length in order to move a small distance when focusing. Therefore, the rear group G1-2 of the first lens group G1 is designed to have the following focal length defined by Inequality 1:

$$1.2 < f1a/f1b < 1.8 \quad (1)$$

wherein f1$a$ and f1$b$ denote the focal distance of the front group G1-1 of the first lens group G1 and that of the rear group G1-2 of the first lens group G1, respectively.

Since a telephoto zoom lens has a long focal length, the viewing angle thereof changes greatly due to hand-shaking. In the present invention, the second lens group G2 compensates for shaking of an image plane caused by hand-shaking, by moving in a direction perpendicular to the optical axis. As the focal length of a lens group used to compensate for hand-shaking is shorter, the lens group can move a smaller distance. Thus, the second lens group G2 has the shortest focal length from among the four lens groups G1, G2, G3, and G4, and it compensates for hand-shaking. In addition, in order to obtain a sufficient minimum photographing distance and reduce performance change generated in the assembly of the lens system, the focal length of the second lens group G2 has a negative refractive power that satisfies Inequality 2:

$$0.5 < f2\text{in}/fT < 0.9 \quad (2)$$

wherein f2in denotes the combined focal length of the lenses positioned second and third in the second lens group G2 from the object side O, and fT denotes the focal length of the zoom lens at a telephoto position. In the present invention, the second lens group G2 compensates for hand-shaking and is a variator. In general, a variator is highly sensitive, and thus its performance changes greatly according to the manufacture of the lens group. If the second lens group G2 includes four lenses, namely, first, second, third, and fourth lenses arranged sequentially from an object side O, and the first and fourth lenses have negative refractive powers, the second and third lenses are designed to have positive refractive powers in order to compensate for the eccentricity and color aberration of the first and fourth lenses of the second lens group G2. However, if the entire second lens group G2 has a negative refractive power and the combined focal distance of the second and third lenses is too great, the focal length of the entire second lens group G2 is also increased, and thus the second lens group G2 moves a long distance and performs a large amount of compensation for hand-shaking. Thus, the second lens group G2 may be designed to move small distances during zooming and during compensation for hand-shaking by satisfying the condition defined in Inequality 2. In other words, by moving the second lens group G2 which has the highest refractive power from among the four lens groups respectively having positive, negative, positive, and positive refractive powers, hand-shaking is effectively compensated when the second lens group moves a small distance, and a performance change is minimized.

In the present invention, in order to minimize a change in an optical resolving power according to the movement of the rear group G1-2 of the first lens group G1 and properly compensate for color aberration, the rear group G1-2 of the first lens group G1 is constructed as defined in Inequality 3:

$$25 < v\text{max} - v\text{min} < 40 \quad (3)$$

wherein vmax denotes the largest Abbe number of the lenses included in the rear group G1-2 of the first lens group G1, and vmin denotes the smallest Abbe number of the lenses included in the rear group G1-2 of the first lens group G1. The rear group G1-2 of the first lens group G1 compensates for color aberration by using a sheet of crown glass and a sheet of flint glass. For example, in FIG. 1, the fifth lens 5 has a larger Abbe number than the fourth lens 4 and satisfies the condition defined by Inequality 3. On the other hand, since the front group G1-1 of the first lens group G1 does not use a low dispersion material having an Abbe number of 80 or greater, the front group G1-1 may reduce price-increasing factors caused by defects generated during the manufacture of large-aperture doublet lenses.

The present invention provides a bright telephoto zoom lens in which an F number is fixed during zooming. In order to construct such a bright telephoto zoom lens, an F number needs to be kept small even at a telephoto position. In order to keep the F number small, a lens group having a positive refractive power needs to be installed in front of the aperture stop.

In the present invention, lenses conforming to optimization conditions for miniaturizing a zoom lens are included according to embodiments based on the following various designs.

Hereinafter, f denotes the combined focal distance of the entire lens system, Fno denotes an F number, 2$w$ denotes the viewing angle, R denotes the radius of curvature, Dn denotes a central thickness of a lens or an interval between lenses, nd denotes a refractive index of a lens material, and vd denotes an Abbe number. ST denotes an aperture stop, D1, D2, D3, D4, D5, D6, and D7 denote variable distances, and OBJ denotes an object side, and IMG denotes an image side.

FIRST EMBODIMENT

FIG. 1 illustrates a wide angle position, an intermediate position, and a telephoto position of a zoom lens according to an embodiment of the present invention.

f: 72.1~203.6 mm, Fno: 9~2.9, 2$\omega$: 34.36°~11.78°

| Lens surface | R | Dn | nd | vd |
|---|---|---|---|---|
| OBJ | ∞ | | | |
| S1 | 166.159 | 2.20 | 1.83481 | 42.7 |
| S2 | 76.100 | 10.00 | 1.48749 | 70.4 |
| S3 | 536.464 | 0.10 | | |
| S4 | 75.213 | 7.50 | 1.49700 | 81.6 |
| S5 | 196.258 | D1 | | |
| S6 | 79.852 | 2.50 | 1.75520 | 27.5 |
| S7 | 60.168 | 1.504 | | |
| S8 | 70.364 | 9.63 | 1.56883 | 56.0 |
| S9 | ∞ | D2 | | |
| S10 | ∞ | 1.90 | 1.75520 | 27.5 |
| S11 | 34.203 | 5.977 | | |
| S12 | −118.471 | 1.80 | 1.48749 | 70.4 |
| S13 | 37.723 | 7.00 | 1.92286 | 20.9 |
| S14 | ∞ | 2.322 | | |
| S15 | −66.898 | 1.90 | 1.80610 | 40.7 |
| S16 | ∞ | D3 | | |
| S17 | −453.178 | 5.00 | 1.49700 | 81.6 |
| S18 | −100.675 | 0.20 | | |
| S19 | 119.119 | 8.00 | 1.48749 | 70.4 |
| S20 | −49.011 | 2.00 | 1.74950 | 35.0 |

-continued

| Lens surface | R | Dn | nd | vd |
|---|---|---|---|---|
| S21 | −103.52 | D4 | | |
| ST | ∞ | 1.00 | | |
| S23 | 47.456 | 2.00 | 1.80518 | 25.5 |
| S24 | 24.773 | 9.50 | 1.69680 | 55.5 |
| S25 | 81.283 | 11.05 | | |
| S26 | 56.143 | 12.93 | 1.84666 | 23.8 |
| S27 | −37.436 | 3.00 | 1.72342 | 38.0 |
| S28 | 34.261 | 10.463 | | |
| S29 | 64.857 | 9.00 | 1.48749 | 70.4 |
| S30 | −28.132 | 2.2 | 1.84666 | 23.8 |
| S31 | −95.253 | D5 | | |
| S32 | ∞ | 3.00 | 1.51872 | 64.2 |
| S33 | ∞ | D6 | | |
| IMG | ∞ | | | |

Variable distances in the zoom lens according to the embodiment illustrated in FIG. 1 are shown in the following.

| Variable distance | Wide angle position | Intermediate position | Telephoto position |
|---|---|---|---|
| D1 | 14.160 | 14.160 | 14.160 |
| D2 | 2.520 | 21.453 | 40.387 |
| D3 | 41.032 | 31.05 | 2.193 |
| D4 | 11.101 | 2.150 | 12.074 |
| D5 | 55.709 | 55.610 | 55.576 |
| D6 | 1.00 | 1.00 | 1.00 |

Figure 2C:
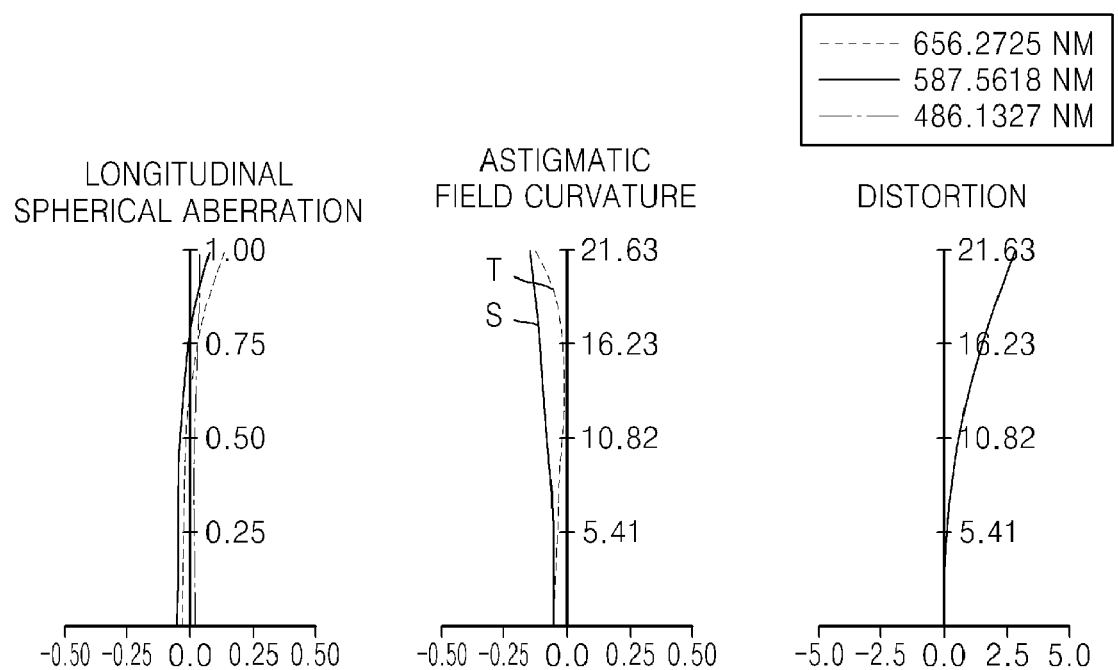
Figure 3A:
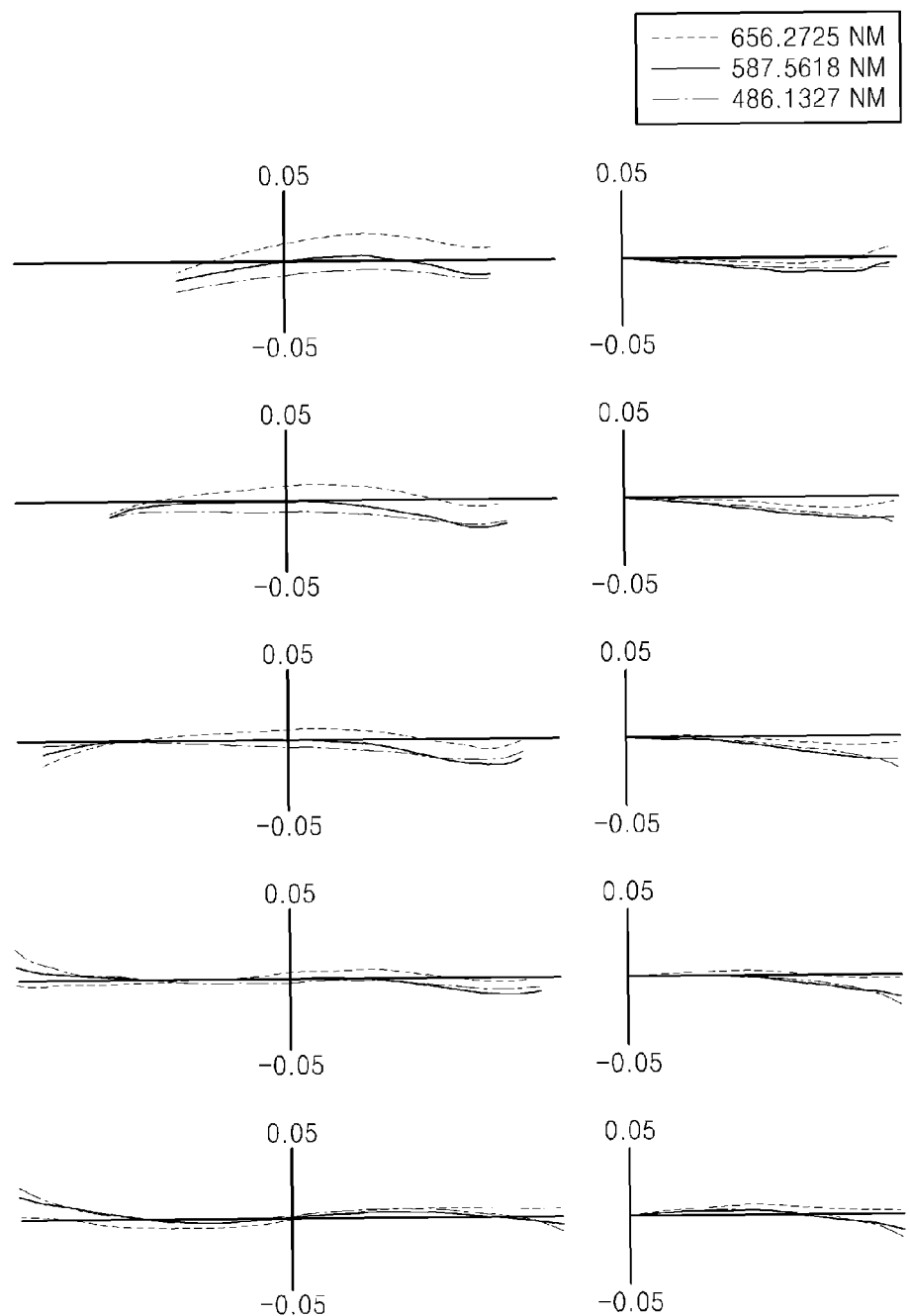
FIGS. 3A through 3C illustrate ray fans obtained by hand-shaking of a second lens group at the wide angle position of the zoom lens according to the embodiment illustrated in FIG. 1.
Figure 3B:
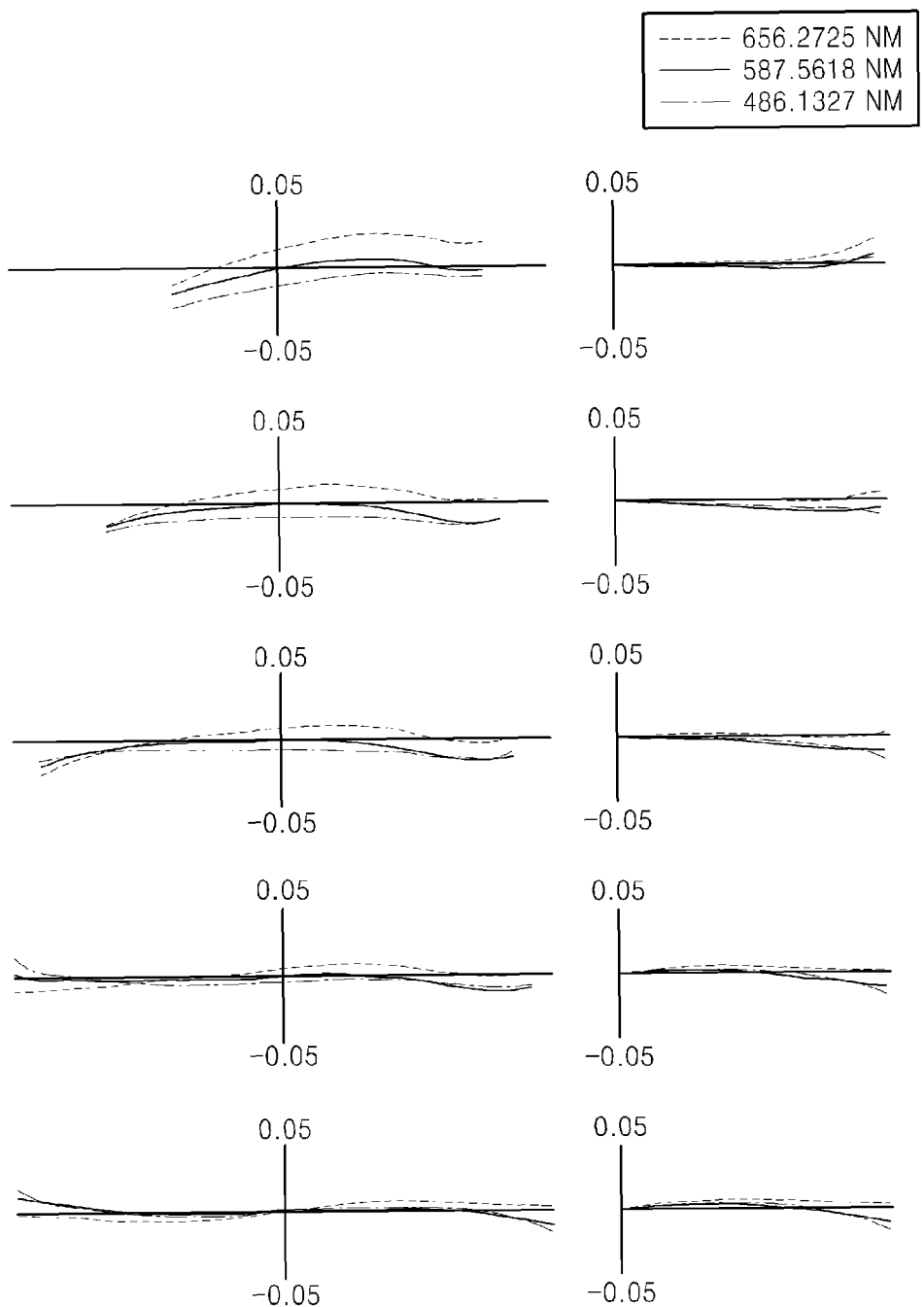
Figure 3C:
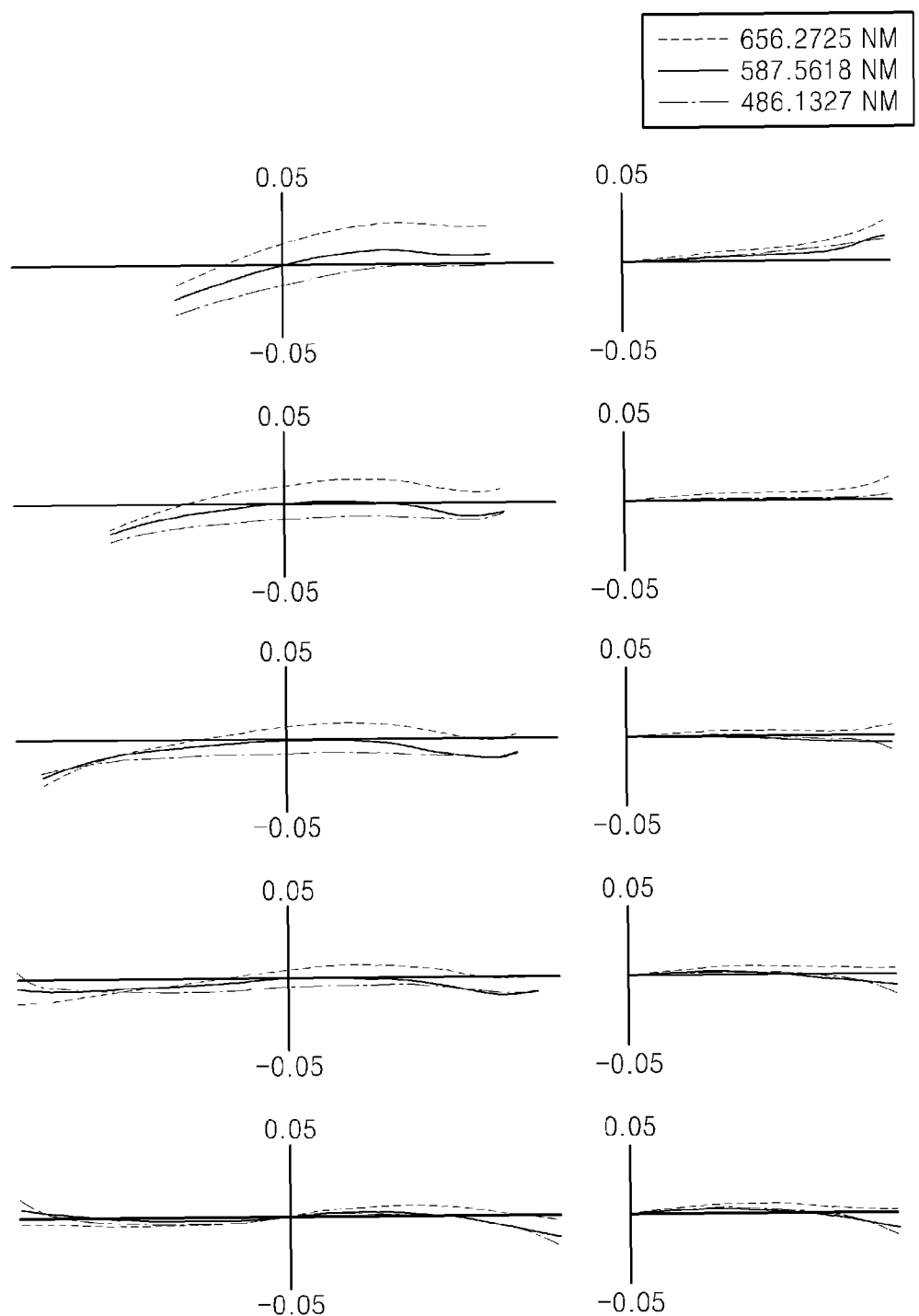
Figure 4A:
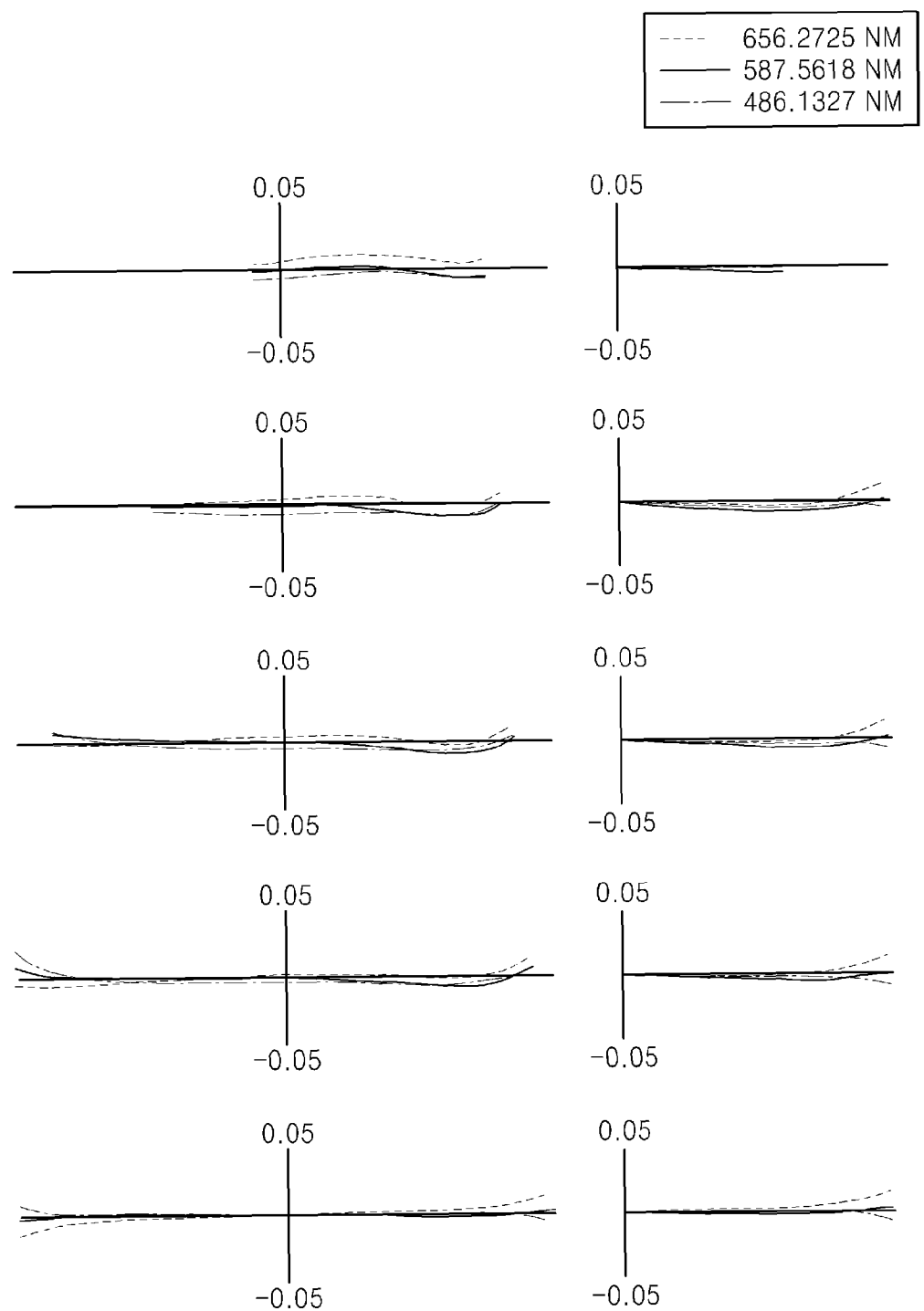
Figure 4B:
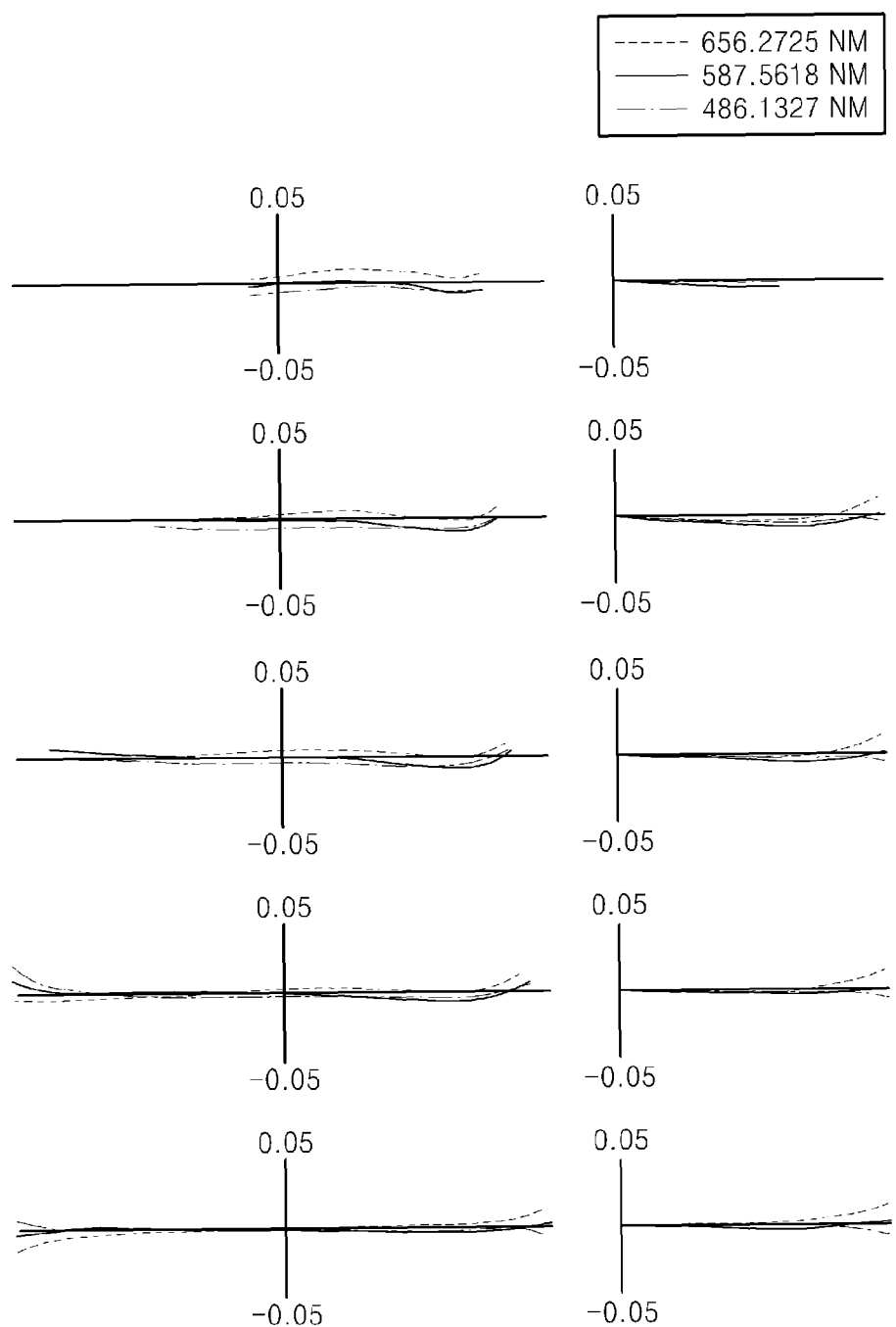
Figure 5A:
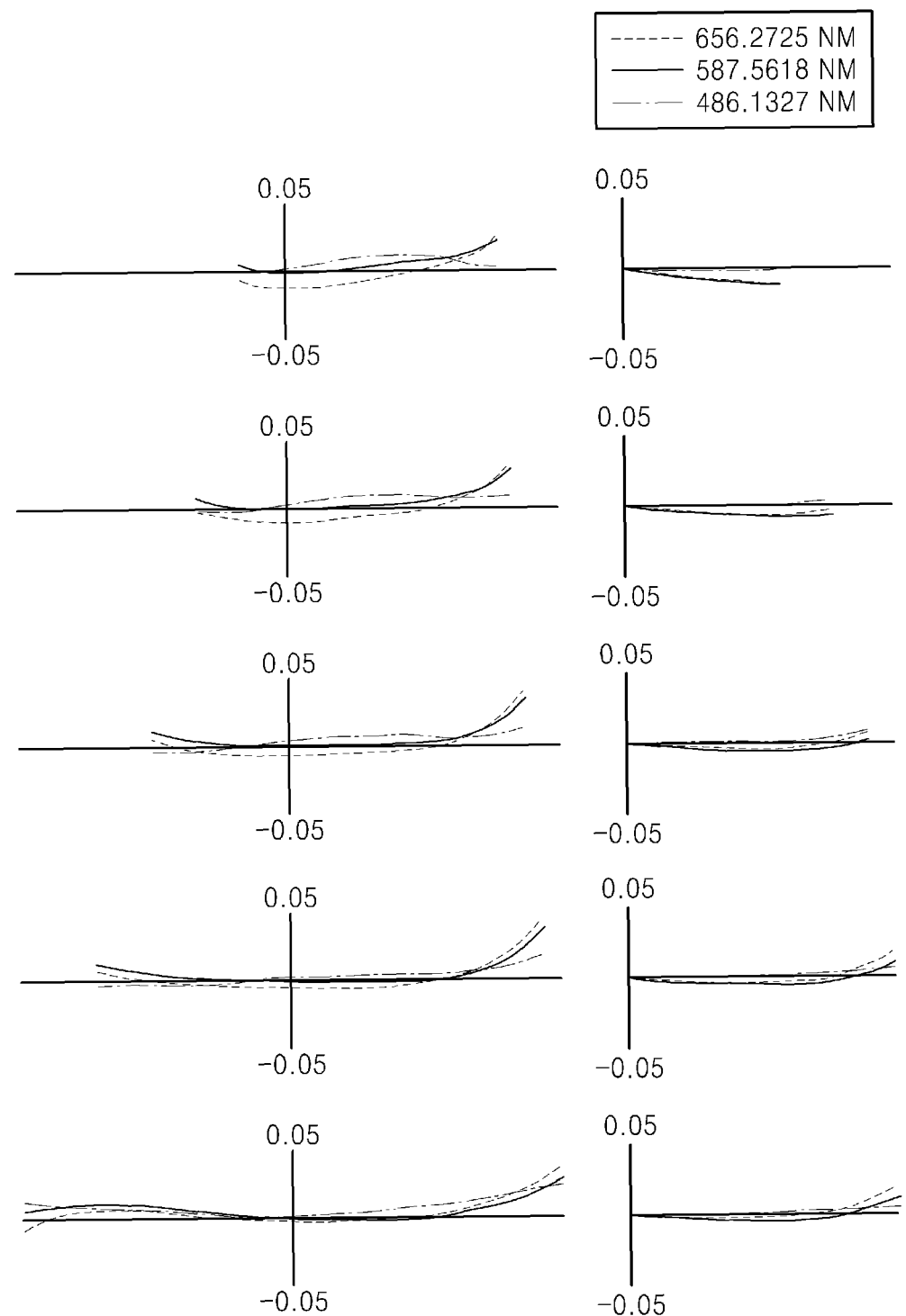
FIGS. 5A through 5C illustrate ray fans obtained by hand-shaking of the second lens group at the telephoto position of the zoom lens according to the embodiment illustrated in FIG. 1.
Figure 5B:
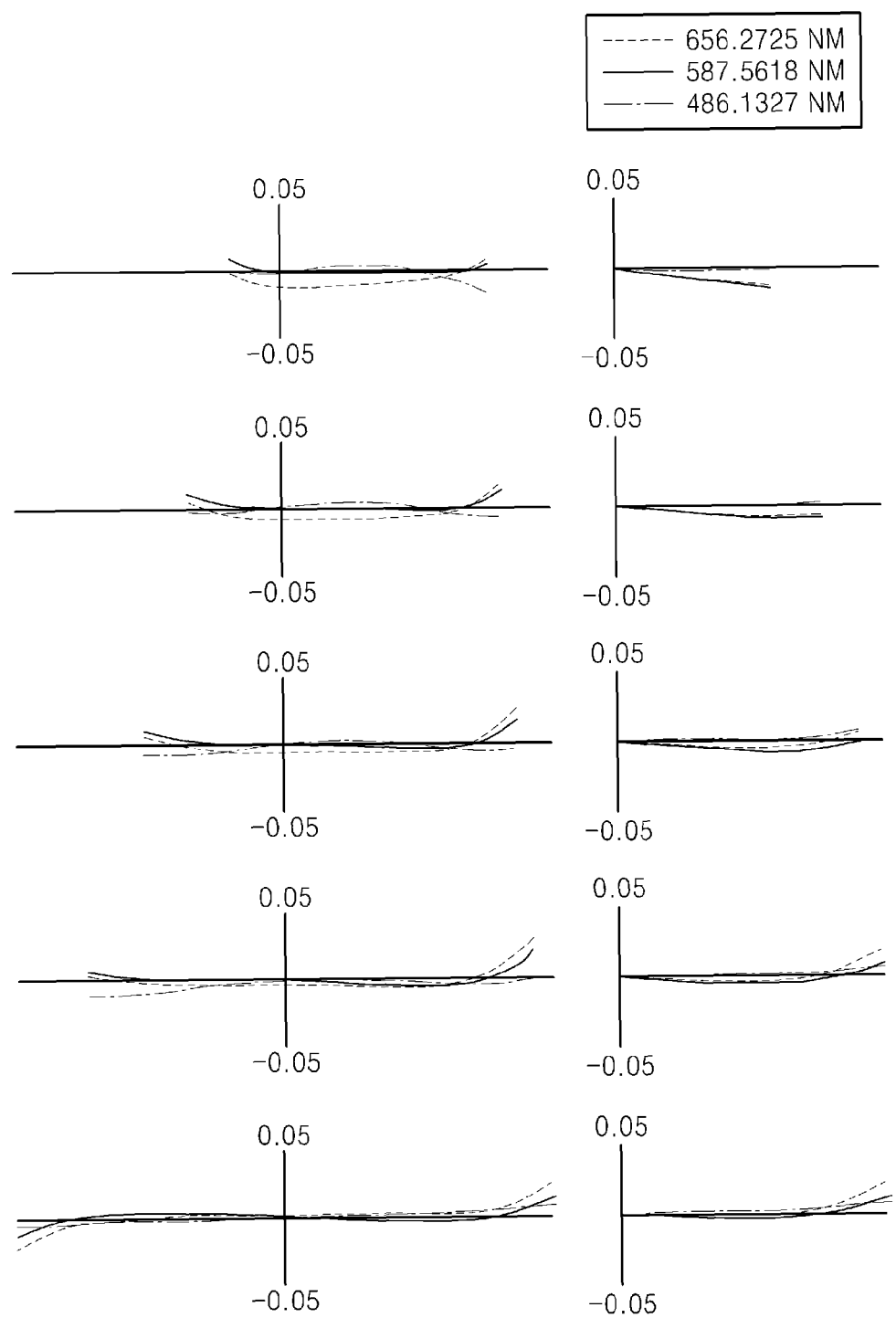
Figure 5C:
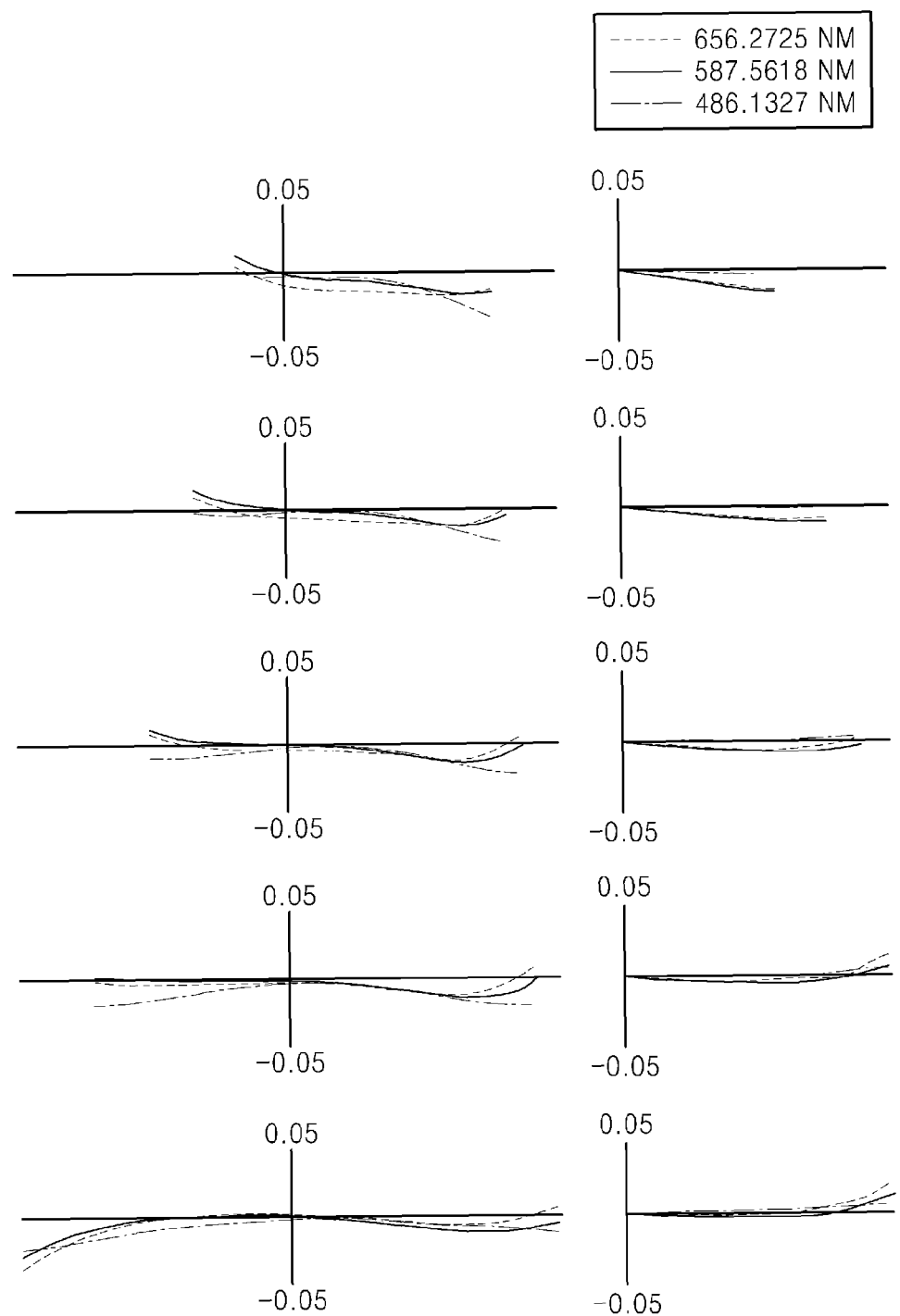

FIGS. 2A through 2C illustrate spherical aberration at a wide angle position, astigmatic field curvature at an intermediate position, and distortion at a telephoto position of the zoom lens according to the embodiment illustrated in FIG. 1. Tangential field curvature T and sagittal field curvature S are illustrated as the astigmatic field curvature. FIG. 3A illustrates ray fans obtained when the second lens group G2 was moved 0.4 mm upward perpendicularly to the optical axis at the wide angle position in the zoom lens according to the embodiment illustrated in FIG. 1. FIG. 3B illustrates ray fans obtained when the second lens group G2 remains aligned on the optical axis at the wide angle position in the zoom lens according to the embodiment illustrated in FIG. 1. FIG. 3C illustrates ray fans obtained when the second lens group G2 was moved 0.4 mm downward perpendicularly to the optical axis at the wide angle position in the zoom lens according to the embodiment illustrated in FIG. 1. Similarly, FIGS. 4A through 4C illustrate ray fans obtained at the intermediate position of the zoom lens according to the embodiment illustrated in FIG. 1. Similarly, FIGS. 5A through 5C illustrate ray fans obtained at the telephoto position of the zoom lens according to the embodiment illustrated in FIG. 1.

SECOND EMBODIMENT

FIG. 6 illustrates a wide angle position, an intermediate position, and a telephoto position of a zoom lens according to another embodiment of the present invention.

f: 72.1-203.7 mm, Fno: 2.9-2.9, 2ω: 34.35°-11.78°

| Lens surface | R | Dn | nd | vd |
|---|---|---|---|---|
| OBJ | ∞ | | | |
| S1 | 169.694 | 2.20 | 1.83481 | 42.7 |
| S2 | 76.513 | 10.00 | 1.48749 | 70.4 |
| S3 | 607.608 | 0.10 | | |
| S4 | 75.883 | 7.50 | 1.49700 | 81.6 |
| S5 | 206.280 | D1 | | |
| S6 | 81.878 | 2.50 | 1.75520 | 27.5 |
| S7 | 61.234 | 1.413 | | |
| S8 | 71.141 | 9.55 | 1.56883 | 56.0 |
| S9 | ∞ | D2 | | |
| S10 | ∞ | 1.90 | 1.75520 | 27.5 |
| S11 | 34.203 | 5.631 | | |
| S12 | −120.525 | 1.80 | 1.48749 | 70.4 |
| S13 | 37.309 | 7.00 | 1.92286 | 20.9 |
| S14 | ∞ | 2.340 | | |
| S15 | −65.658 | 1.90 | 1.80610 | 40.7 |
| S16 | ∞ | D3 | | |
| S17 | −430.243 | 5.00 | 1.49700 | 81.6 |
| S18 | −102.282 | 0.20 | | |
| S19 | 117.032 | 8.00 | 1.48749 | 70.4 |
| S20 | −48.196 | 2.00 | 1.74950 | 35.0 |
| S21 | −100.840 | D4 | | |
| ST | ∞ | 1.00 | | |
| S23 | 46.111 | 2.00 | 1.80518 | 25.5 |
| S24 | 24.971 | 9.50 | 1.69680 | 55.5 |
| S25 | 71.464 | D5 | | |
| S26 | 59.108 | 15.66 | 1.84666 | 23.8 |
| S27 | −35.665 | 3.00 | 1.72342 | 38.0 |
| S28 | 34.820 | 8.297 | | |
| S29 | 60.276 | 9.00 | 1.48749 | 70.4 |
| S30 | −27.112 | 2.2 | 1.84666 | 23.8 |
| S31 | −87.295 | D6 | | |
| S32 | ∞ | 3.00 | 1.51872 | 64.2 |
| S33 | ∞ | D7 | | |
| IMG | ∞ | | | |

Variable distances in the zoom lens according to the embodiment illustrated in FIG. 6 are shown in the following.

| Variable distance | Wide angle position | Intermediate position | Telephoto position |
|---|---|---|---|
| D1 | 14.160 | 14.160 | 14.160 |
| D2 | 2.520 | 21.453 | 40.387 |
| D3 | 41.032 | 31.05 | 2.193 |
| D4 | 11.101 | 2.150 | 12.074 |
| D5 | 10.108 | 10.349 | 9.543 |
| D6 | 56.649 | 56.557 | 56.478 |
| D7 | 1.00 | 1.00 | 1.00 |

Figure 7A:
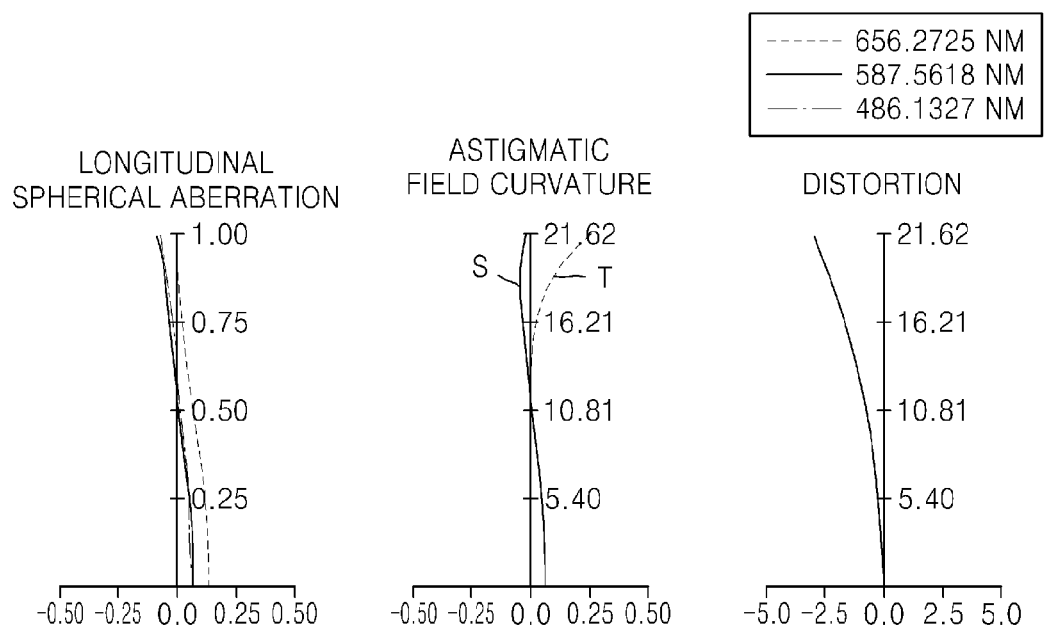
Figure 7B:
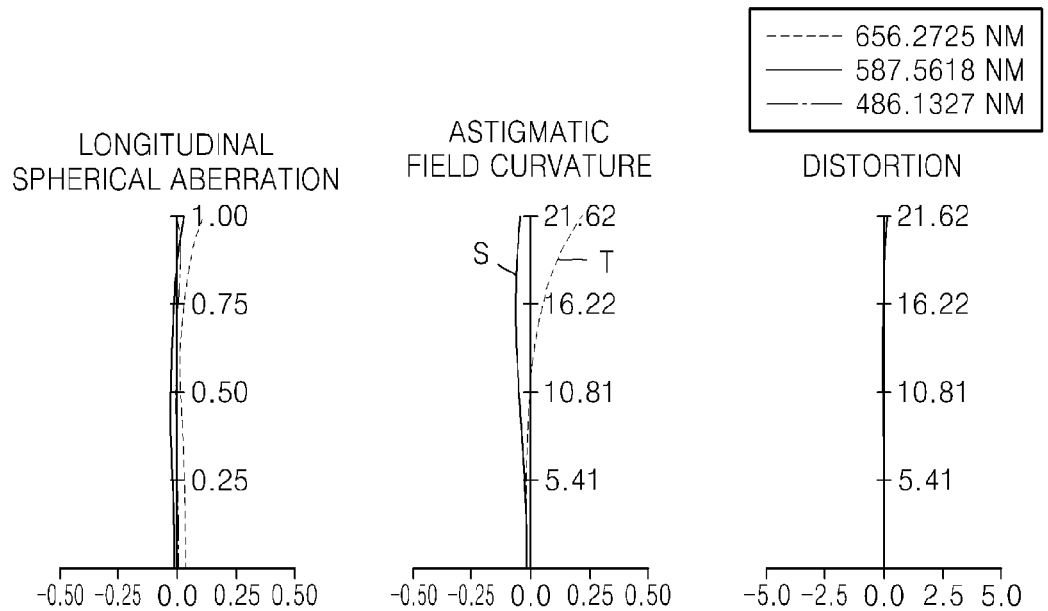
Figure 8A:
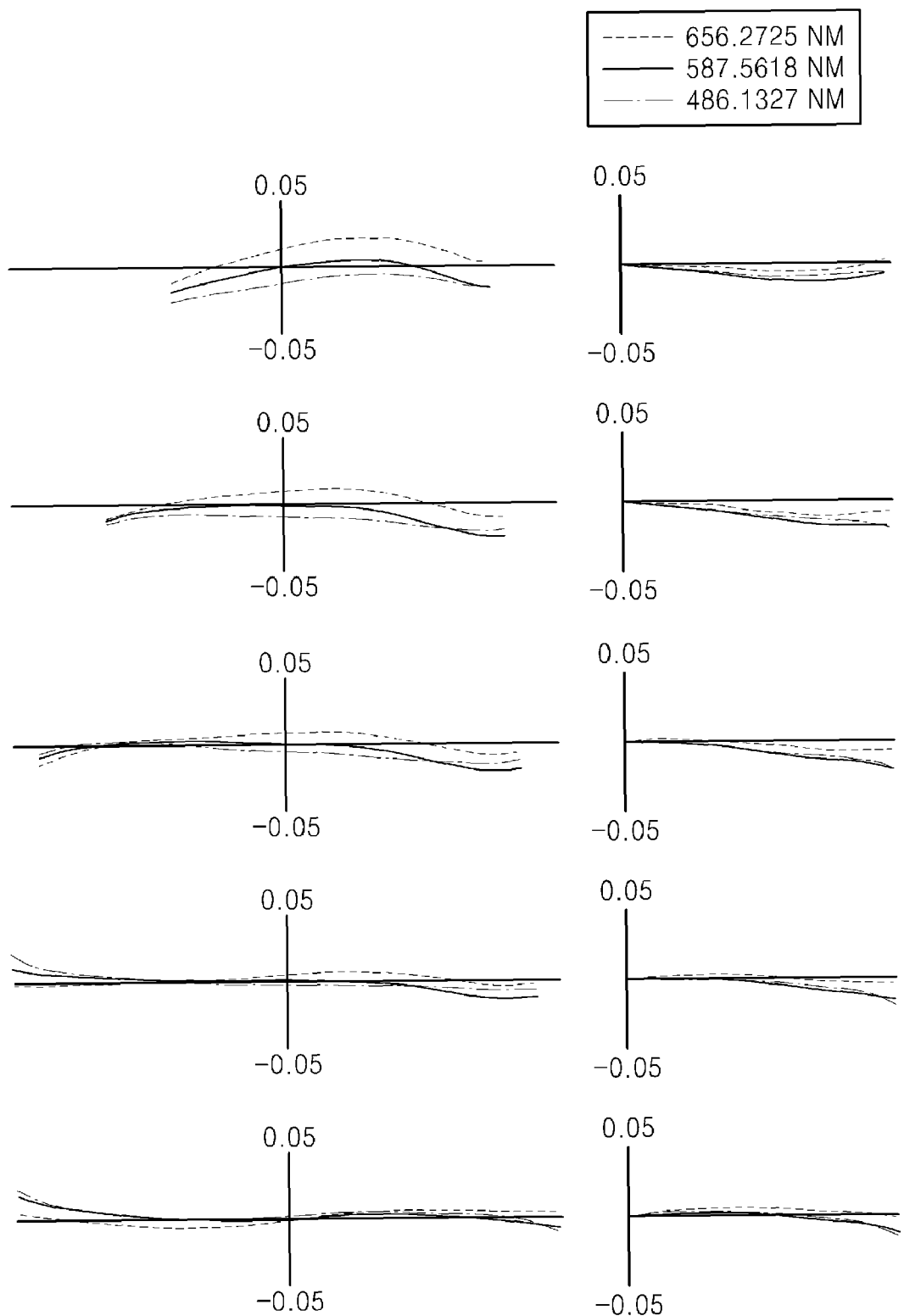
FIGS. 8A through 8C illustrate ray fans obtained by hand-shaking of a second lens group at the wide angle position of the zoom lens according to the embodiment illustrated in FIG. 6.
Figure 8B:
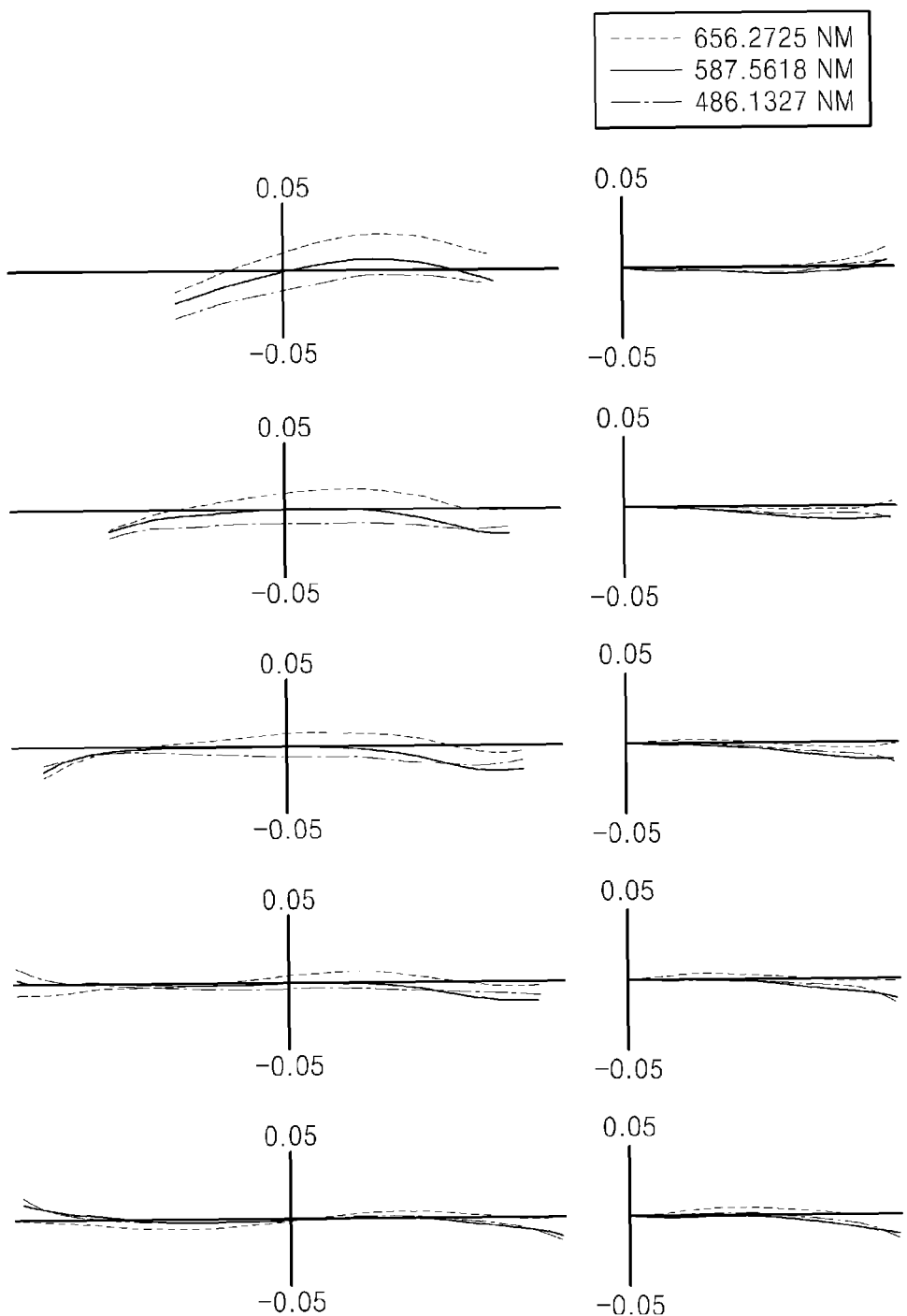
Figure 8C:
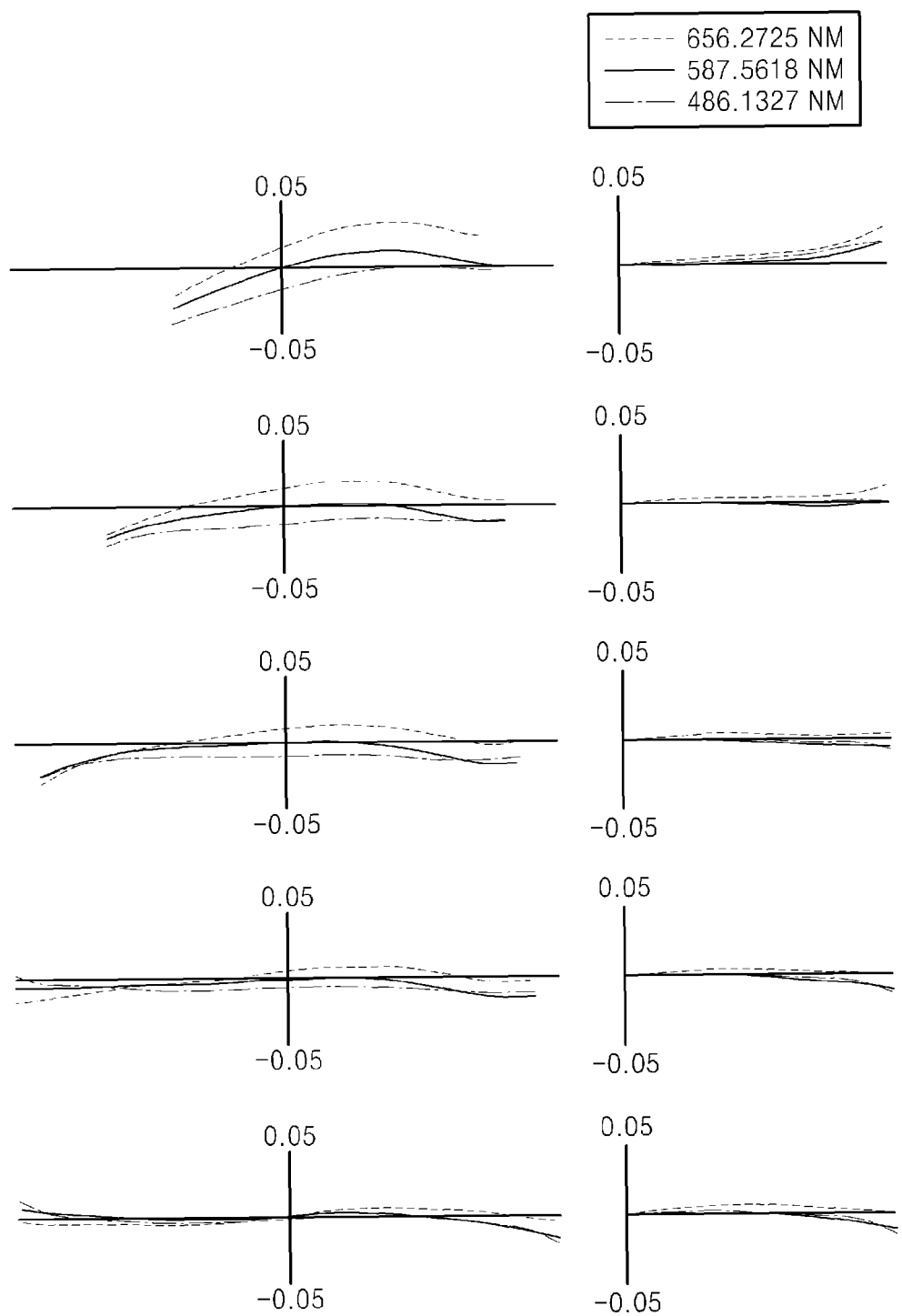
Figure 9A:
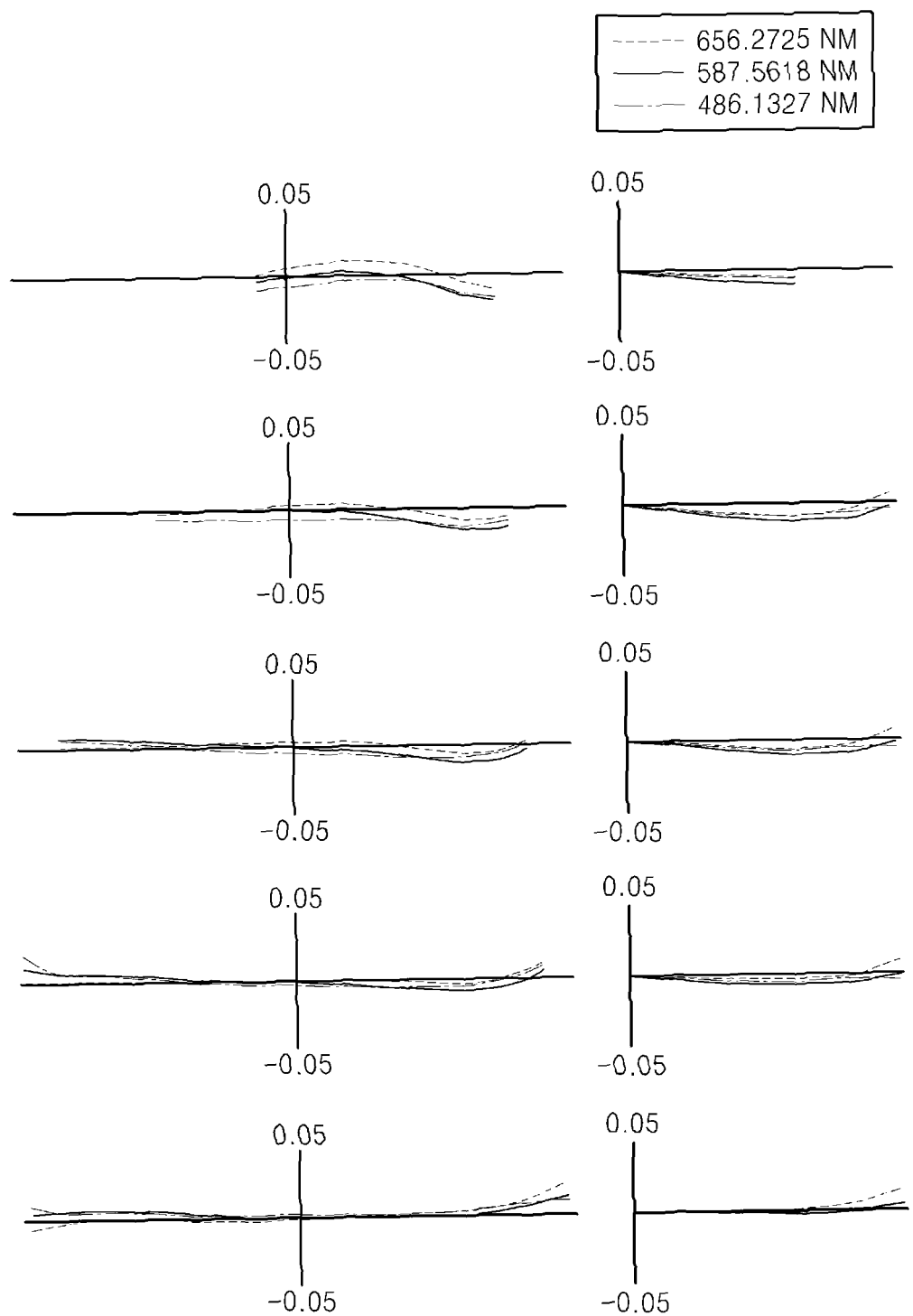
FIGS. 9A through 9C illustrate ray fans obtained by hand-shaking of the second lens group at the intermediate position of the zoom lens according to the embodiment illustrated in FIG. 6.
Figure 9B:
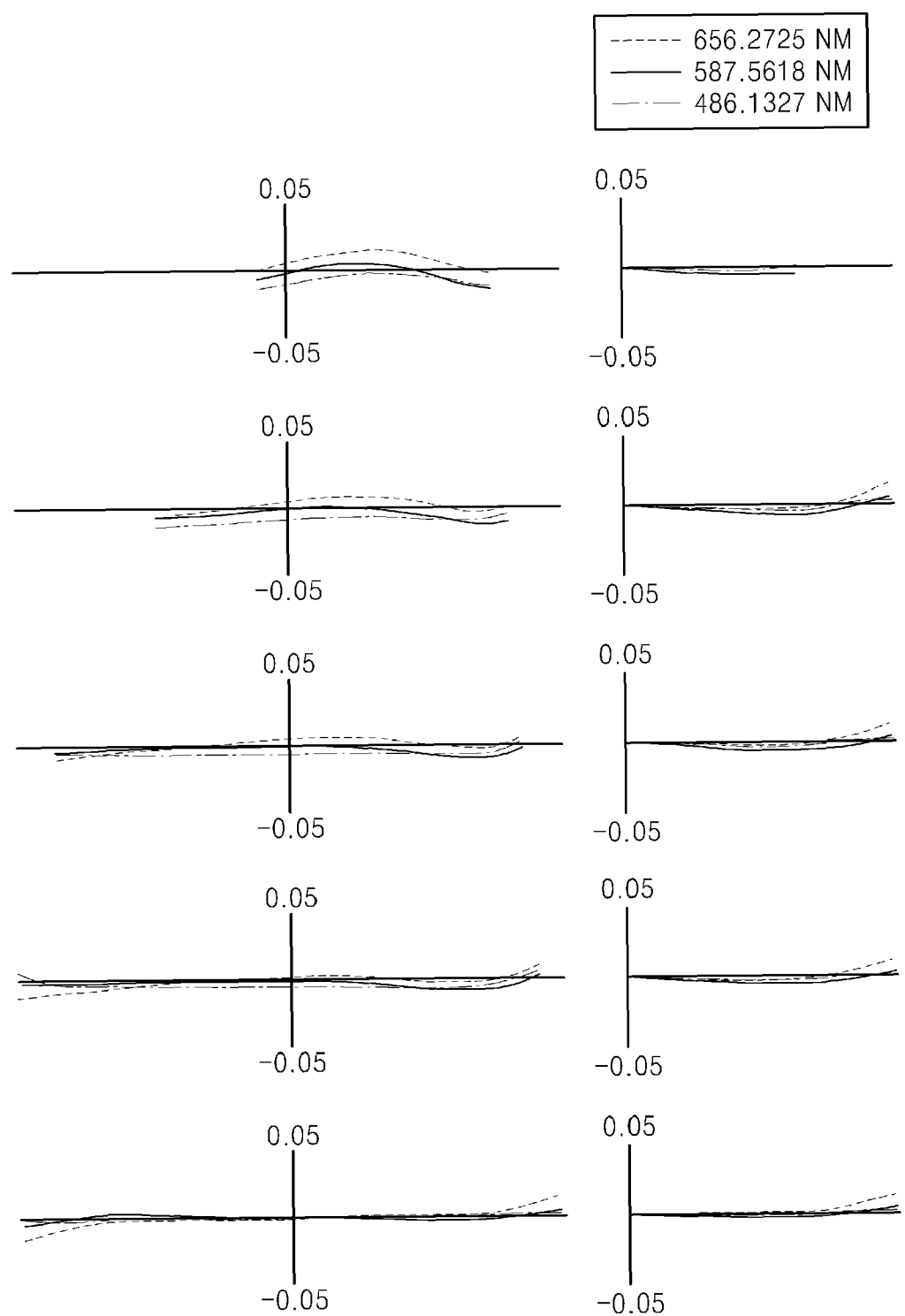
Figure 9C:
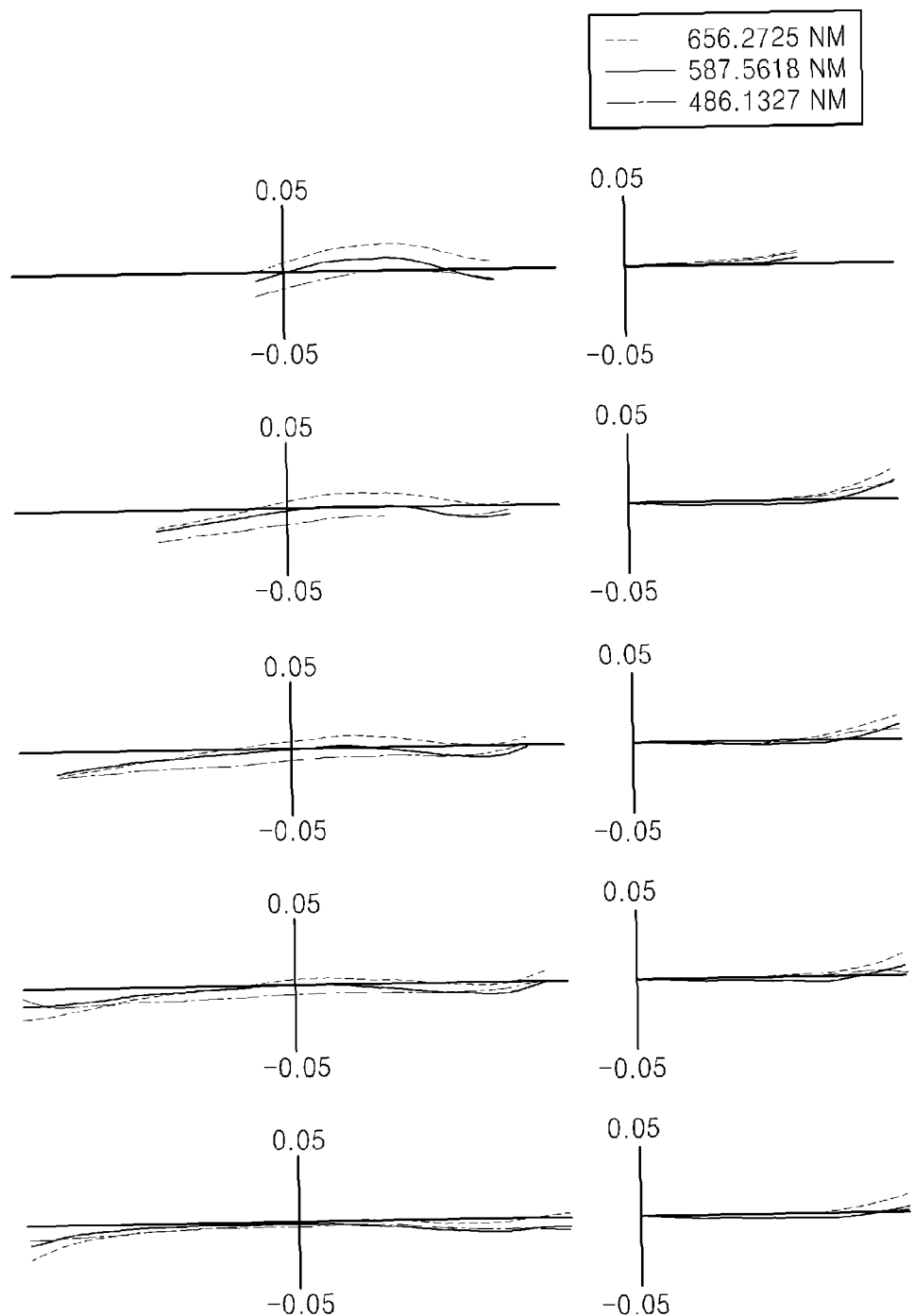
Figure 10A:
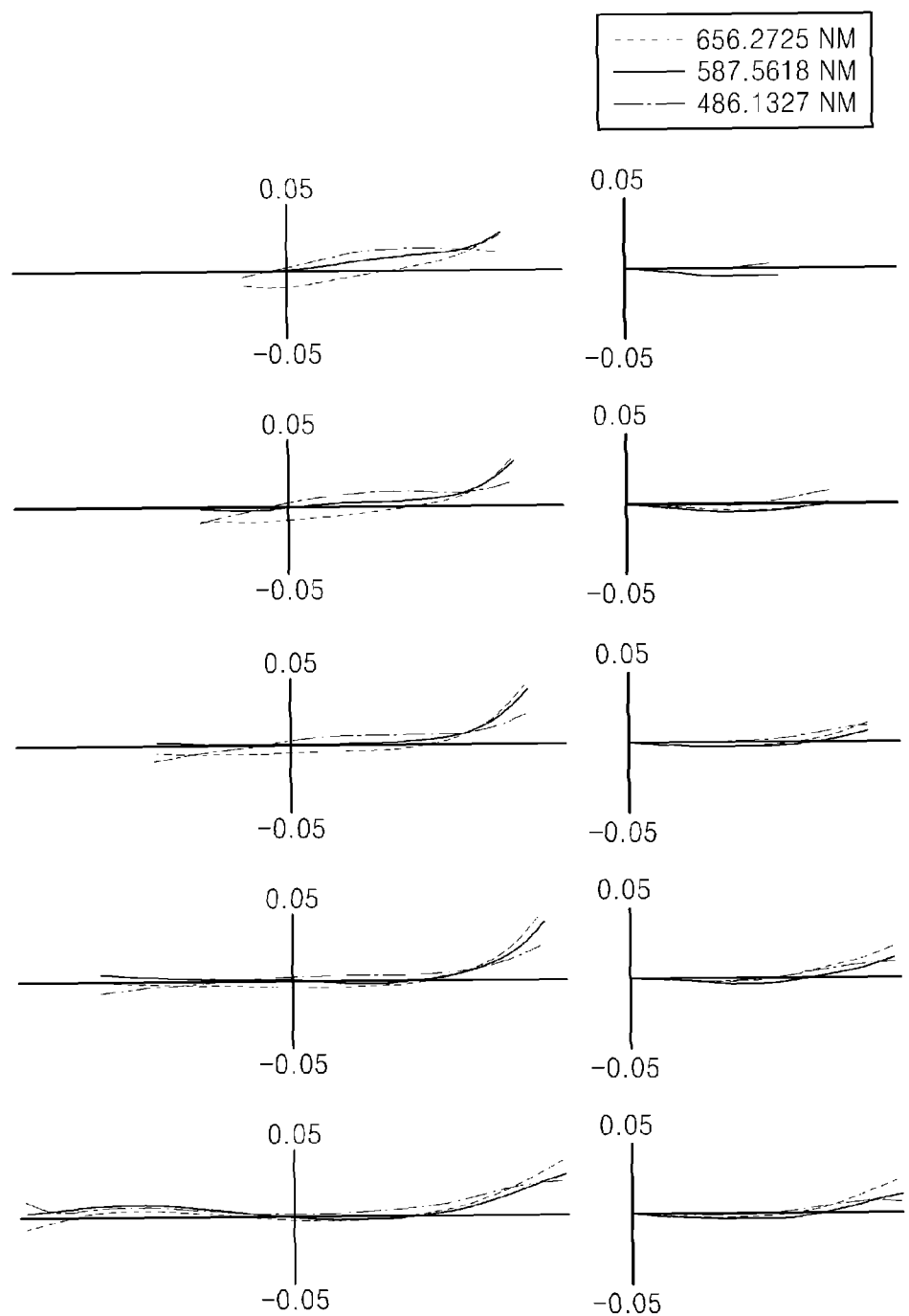
FIGS. 10A through 10C illustrate ray fans obtained by hand-shaking of the second lens group at the telephoto position of the zoom lens according to the embodiment illustrated in FIG. 6.
Figure 10B:
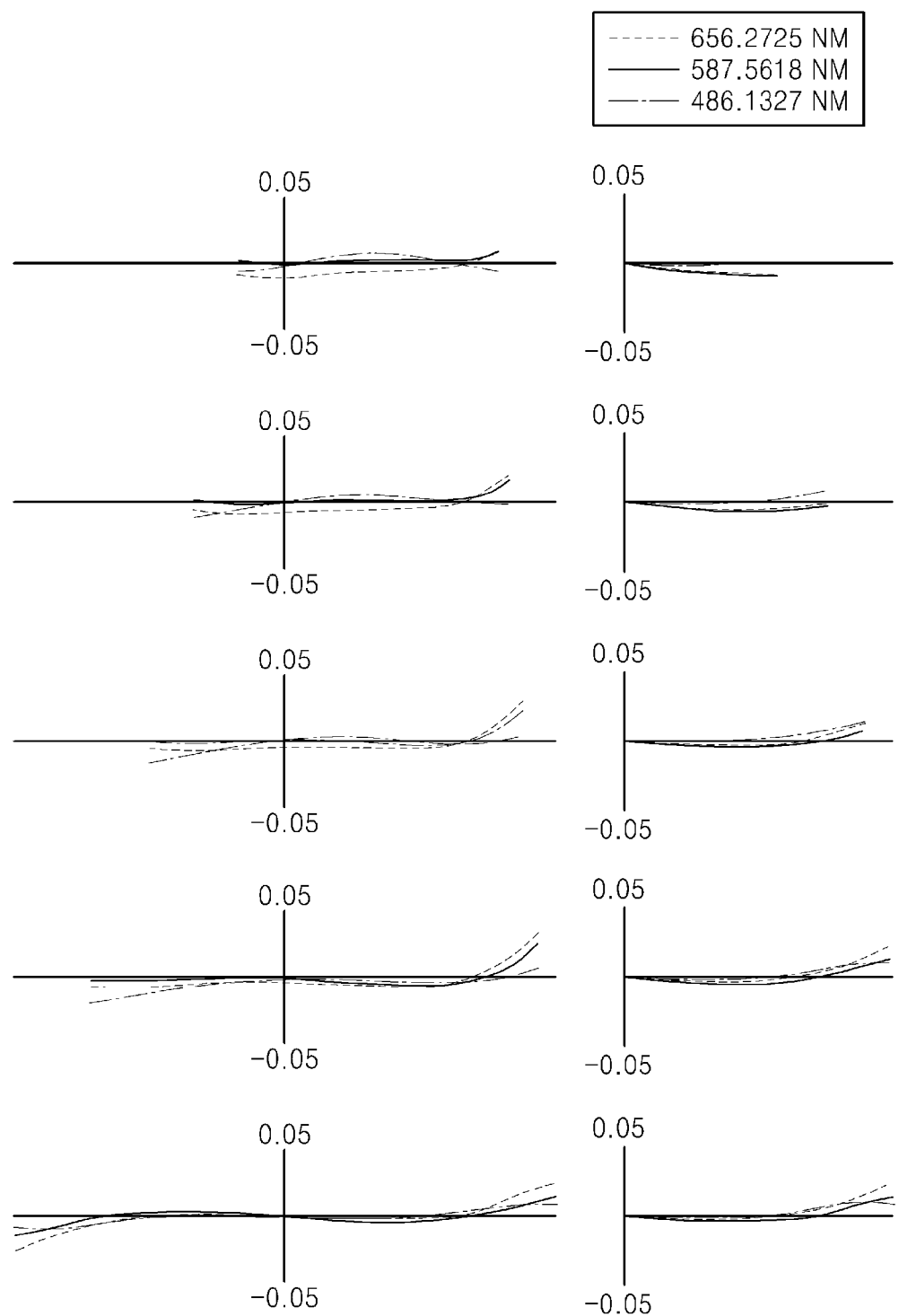
Figure 10C:
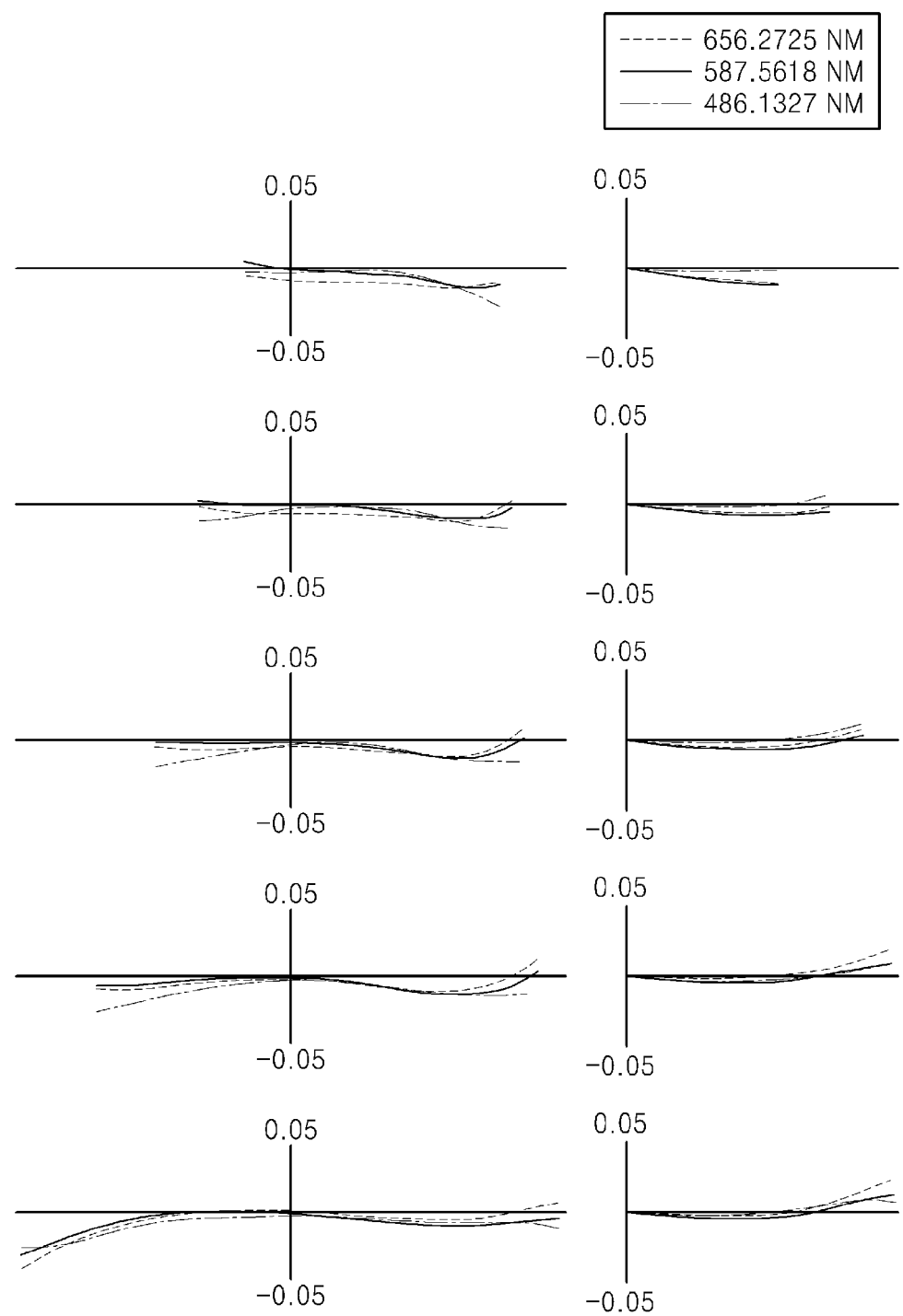

FIGS. 7A through 7C illustrate spherical aberration at a wide angle position, astigmatic field curvature at an intermediate position, and distortion at a telephoto position of the zoom lens according to the embodiment illustrated in FIG. 6. FIGS. 8A through 8C illustrate ray fans obtained at the wide angle position of the zoom lens according to the embodiment illustrated in FIG. 6. FIGS. 9A through 9C illustrate ray fans obtained at the intermediate position of the zoom lens according to the embodiment illustrated in FIG. 6. FIGS. 10A through 10C illustrate ray fans obtained at the telephoto position of the zoom lens according to the embodiment illustrated in FIG. 6.

THIRD EMBODIMENT

FIG. 11 illustrates a wide angle position, an intermediate position, and a telephoto position of a zoom lens according to another embodiment of the present invention.

f: 72.1-203.7 mm, Fno: 2.9-2.9, 2ω: 34.35°-11.78°

| Lens surface | R | Dn | nd | vd |
|---|---|---|---|---|
| OBJ | ∞ | | | |
| S1 | 153.952 | 2.20 | 1.83481 | 42.7 |
| S2 | 73.549 | 10.00 | 1.48749 | 70.4 |
| S3 | 546.771 | 0.10 | | |
| S4 | 74.057 | 7.50 | 1.49700 | 81.6 |
| S5 | 161.838 | D1 | | |
| S6 | 74.341 | 2.50 | 1.84666 | 23.8 |
| S7 | 62.372 | 2.625 | | |
| S8 | 85.461 | 8.23 | 1.62041 | 60.3 |
| S9 | ∞ | D2 | | |
| S10 | ∞ | 1.90 | 1.75520 | 27.5 |
| S11 | 34.274 | 5.695 | | |
| S12 | −117.046 | 1.80 | 1.48749 | 70.4 |
| S13 | 37.574 | 7.00 | 1.92286 | 20.9 |
| S14 | ∞ | 2.417 | | |
| S15 | −66.646 | 1.90 | 1.80610 | 40.7 |
| S16 | ∞ | D3 | | |
| S17 | −743.039 | 5.00 | 1.49700 | 81.6 |
| S18 | −101.925 | 0.20 | | |
| S19 | 120.554 | 8.00 | 1.48749 | 70.4 |
| S20 | −50.222 | 2.00 | 1.74950 | 35.0 |
| S21 | −108.301 | D4 | | |
| ST | ∞ | 1.00 | | |
| S23 | 43.248 | 2.00 | 1.80518 | 25.5 |
| S24 | 25.085 | 9.50 | 1.69680 | 55.5 |
| S25 | 63.370 | 14.035 | | |
| S26 | 60.234 | 13.95 | 1.84666 | 23.8 |
| S27 | −34.954 | 3.00 | 1.72342 | 38.0 |
| S28 | 35.829 | 6.484 | | |
| S29 | 53.989 | 9.00 | 1.48749 | 70.4 |
| S30 | −25.860 | 2.2 | 1.84666 | 23.8 |
| S31 | −93.097 | D5 | | |
| S32 | ∞ | 3.00 | 1.51872 | 64.2 |
| S33 | ∞ | D6 | | |
| IMG | ∞ | | | |

Variable distances in the zoom lens according to the embodiment illustrated in FIG. 11 are shown in the following.

| Variable distance | Wide angle position | Intermediate position | Telephoto position |
|---|---|---|---|
| D1 | 14.160 | 14.160 | 14.160 |
| D2 | 2.520 | 21.863 | 40.205 |
| D3 | 40.354 | 30.544 | 2.211 |
| D4 | 11.683 | 2.150 | 11.140 |
| D5 | 56.270 | 56.183 | 56.104 |
| D6 | 1.00 | 1.00 | 1.00 |

Figure 12A:
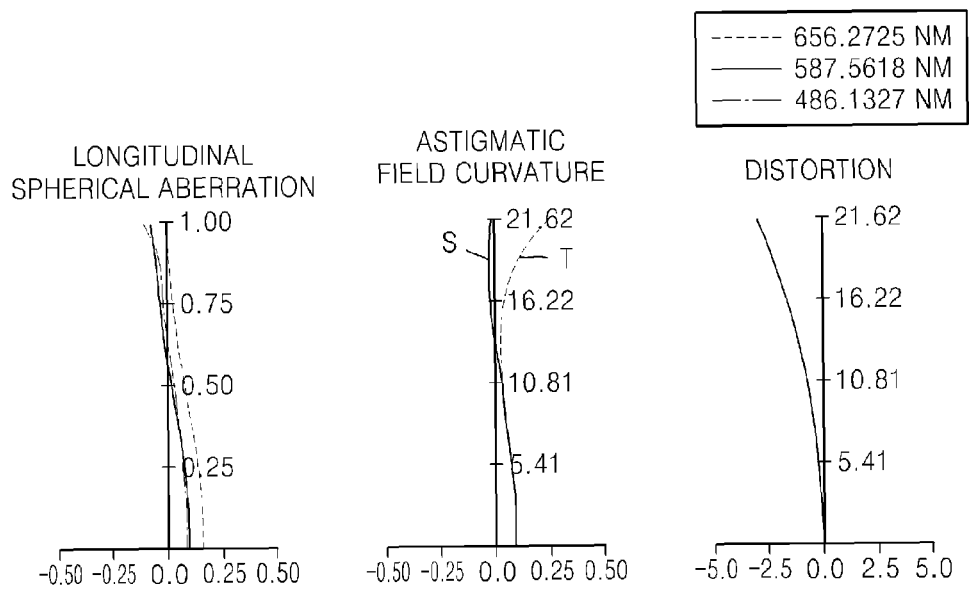
FIGS. 12A through 12C illustrate aberrations at a wide angle position, an intermediate position, and a telephoto position of the zoom lens according to the embodiment illustrated in FIG. 11.
Figure 12B:
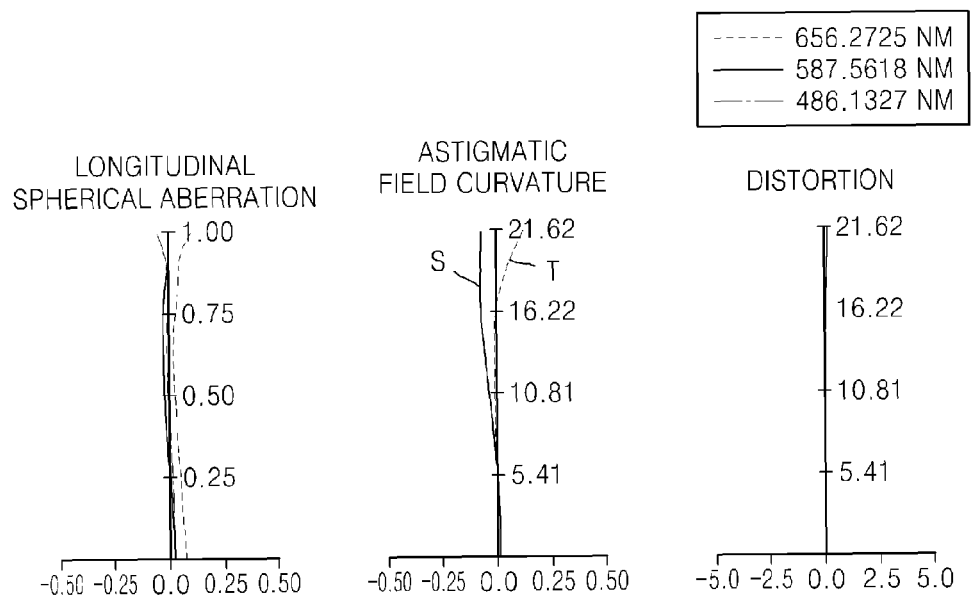
Figure 12C:
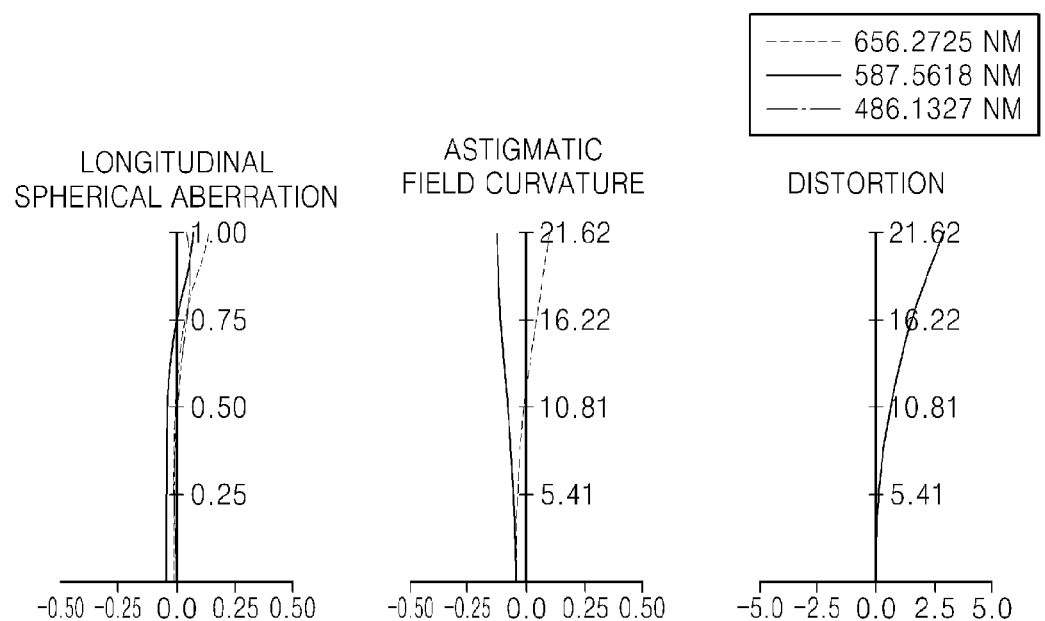
Figure 13A:
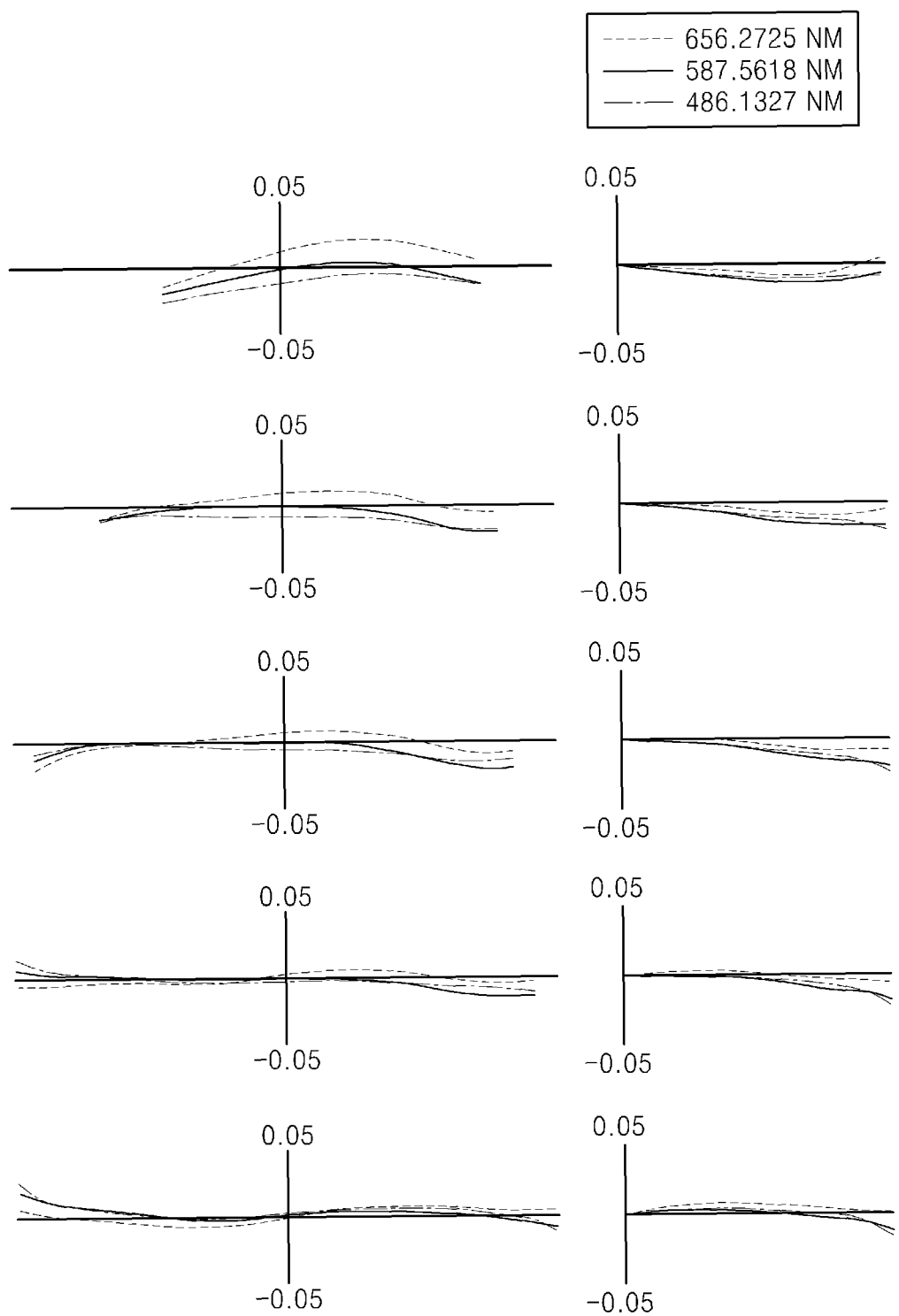
FIGS. 13A through 13C illustrate ray fans obtained by hand-shaking of a second lens group at the wide angle position of the zoom lens according to the embodiment illustrated in FIG. 11.
Figure 13B:
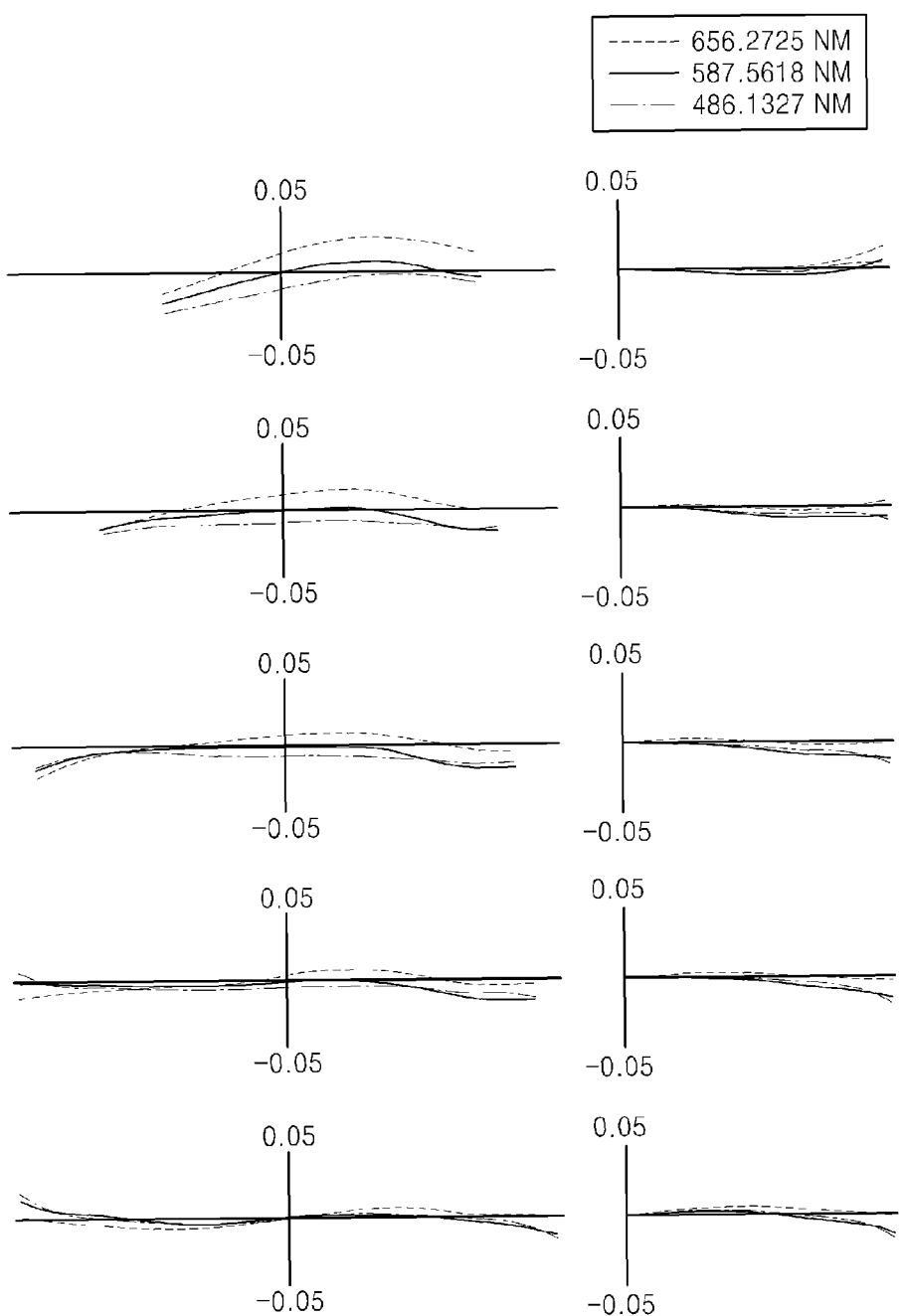
Figure 13C:
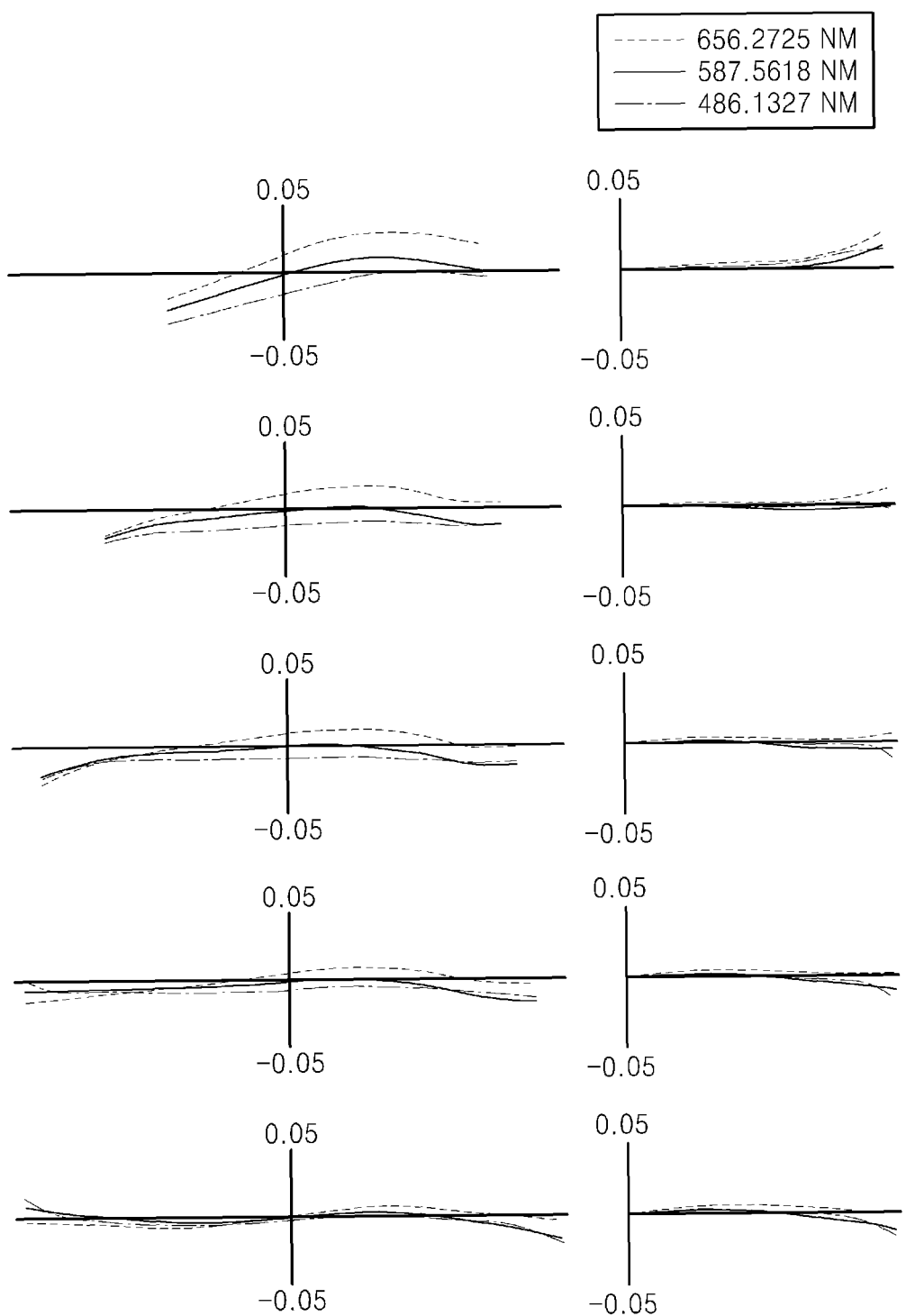
Figure 14A:
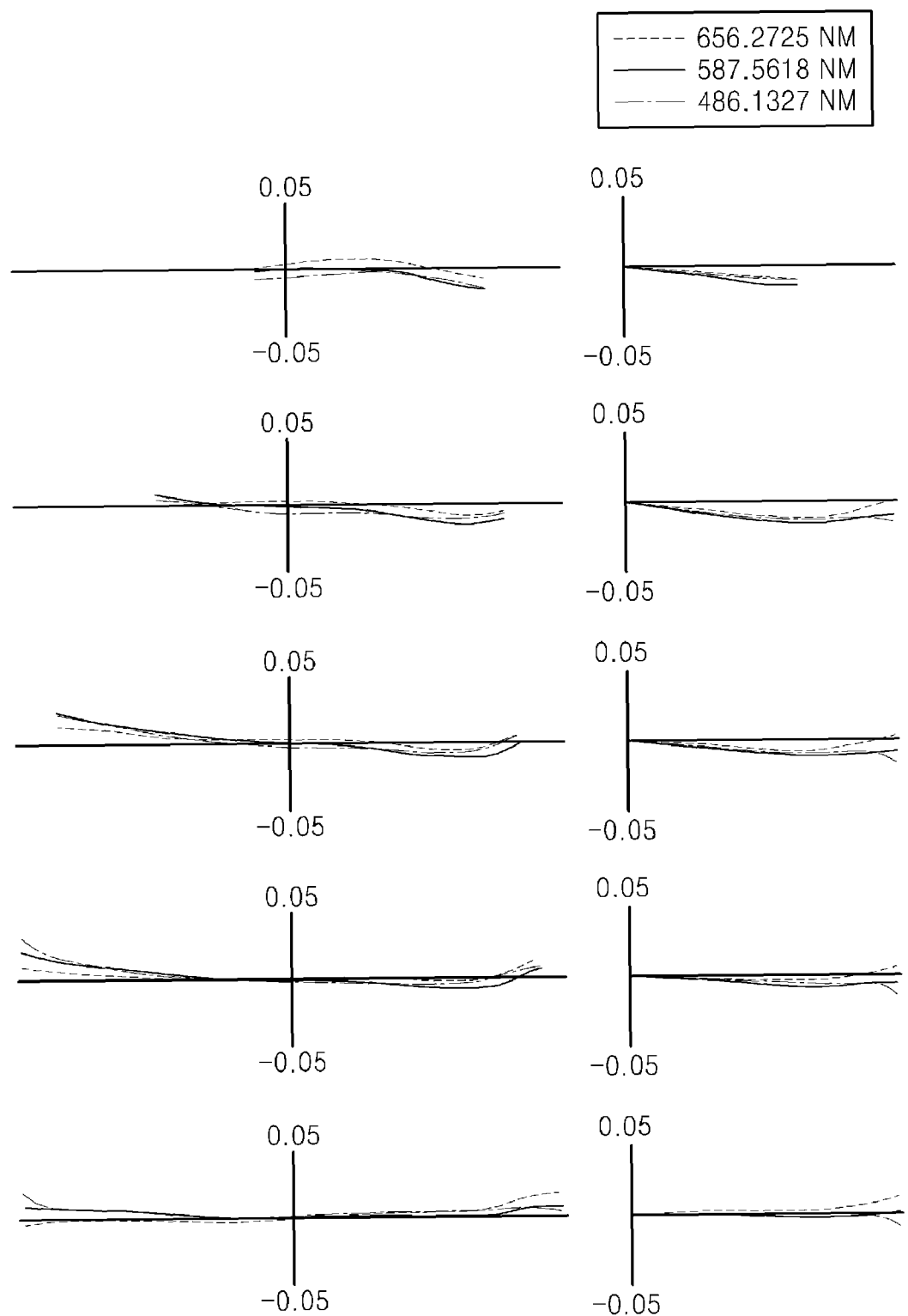
FIGS. 14A through 14C illustrate ray fans obtained by hand-shaking of the second lens group at the intermediate position of the zoom lens according to the embodiment illustrated in FIG. 11.
Figure 14B:
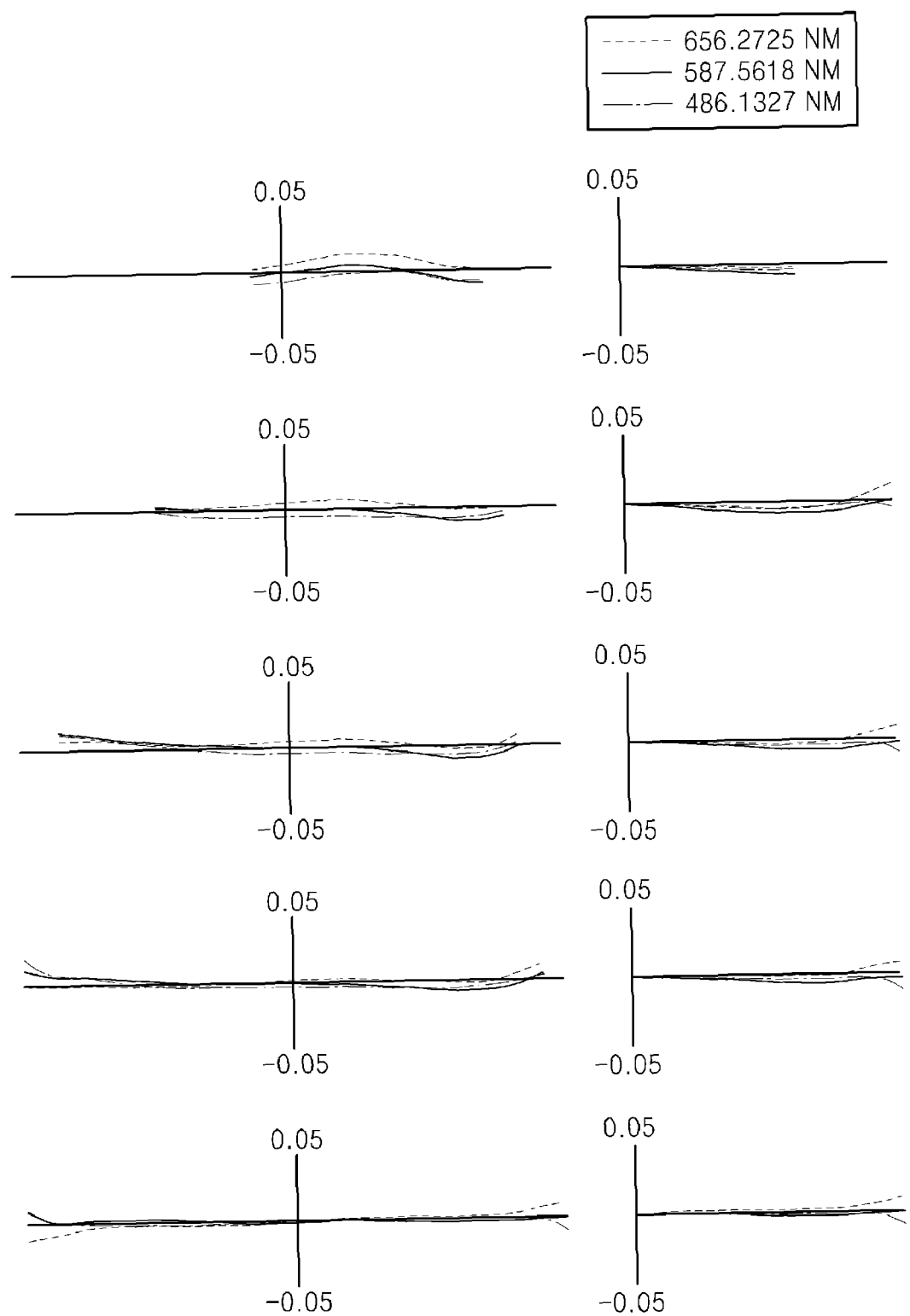
Figure 14C:
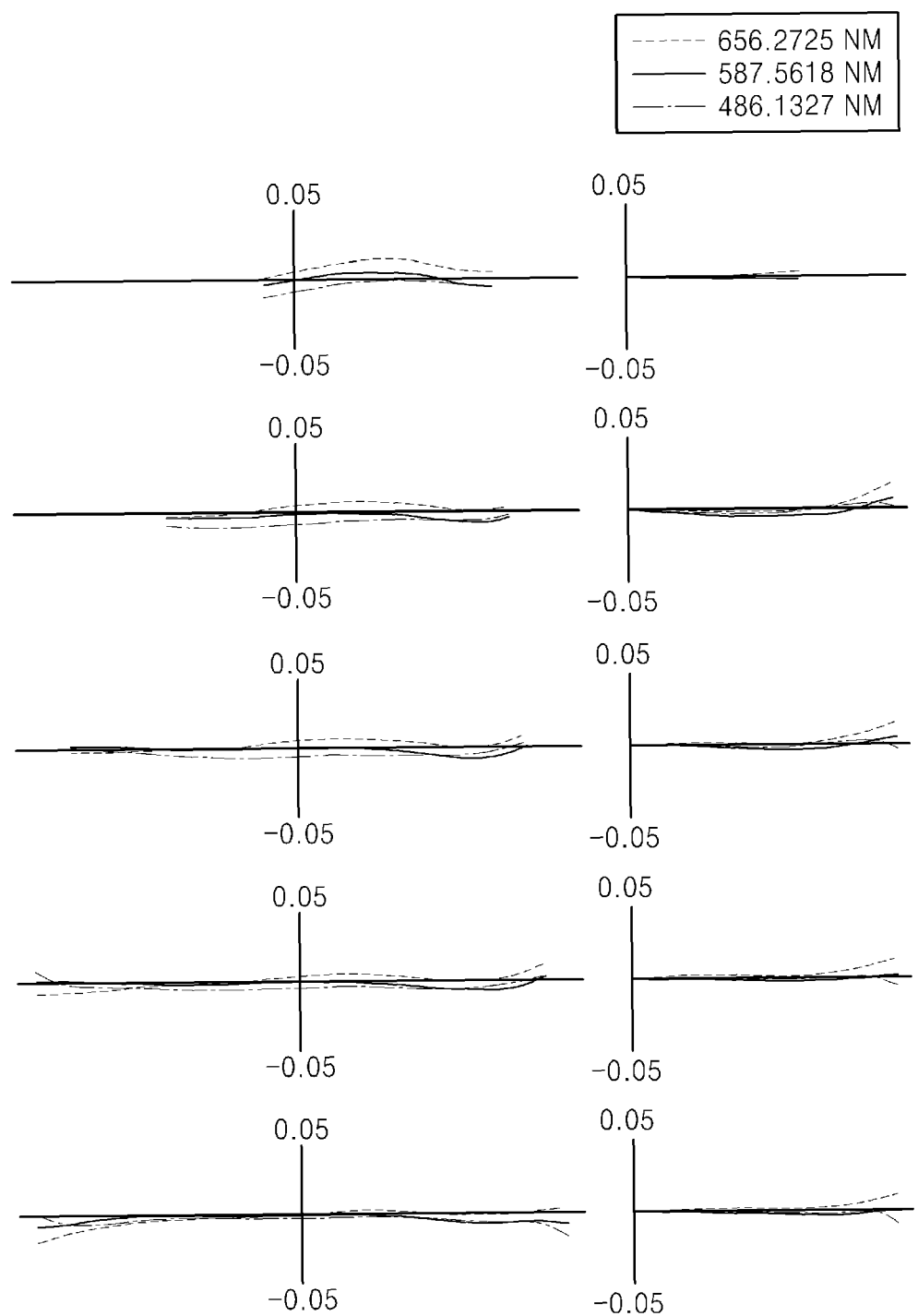
Figure 15A:
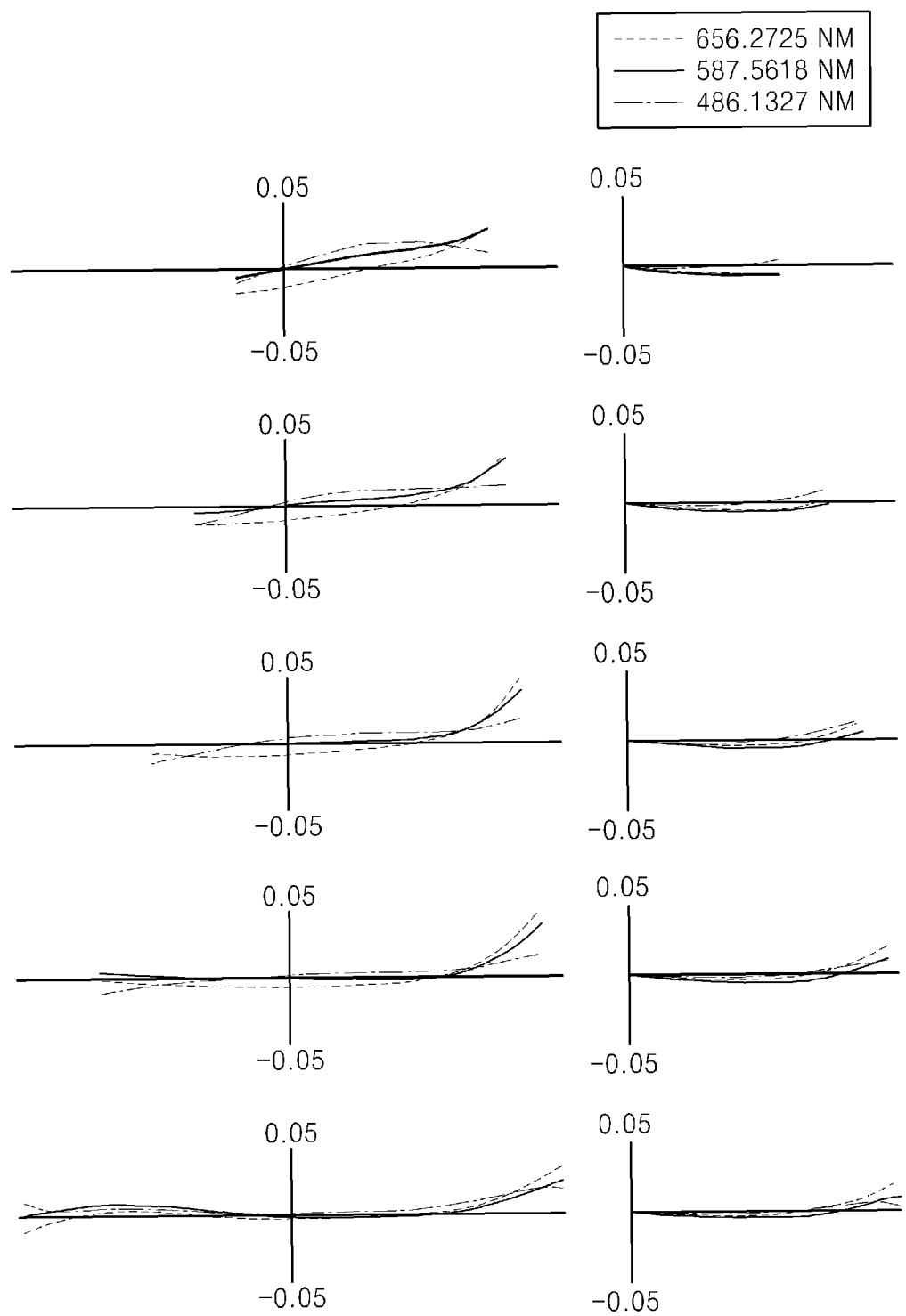
FIGS. 15A through 15C illustrate ray fans obtained by hand-shaking of the second lens group at the telephoto position of the zoom lens according to the embodiment illustrated in FIG. 11.
Figure 15B:
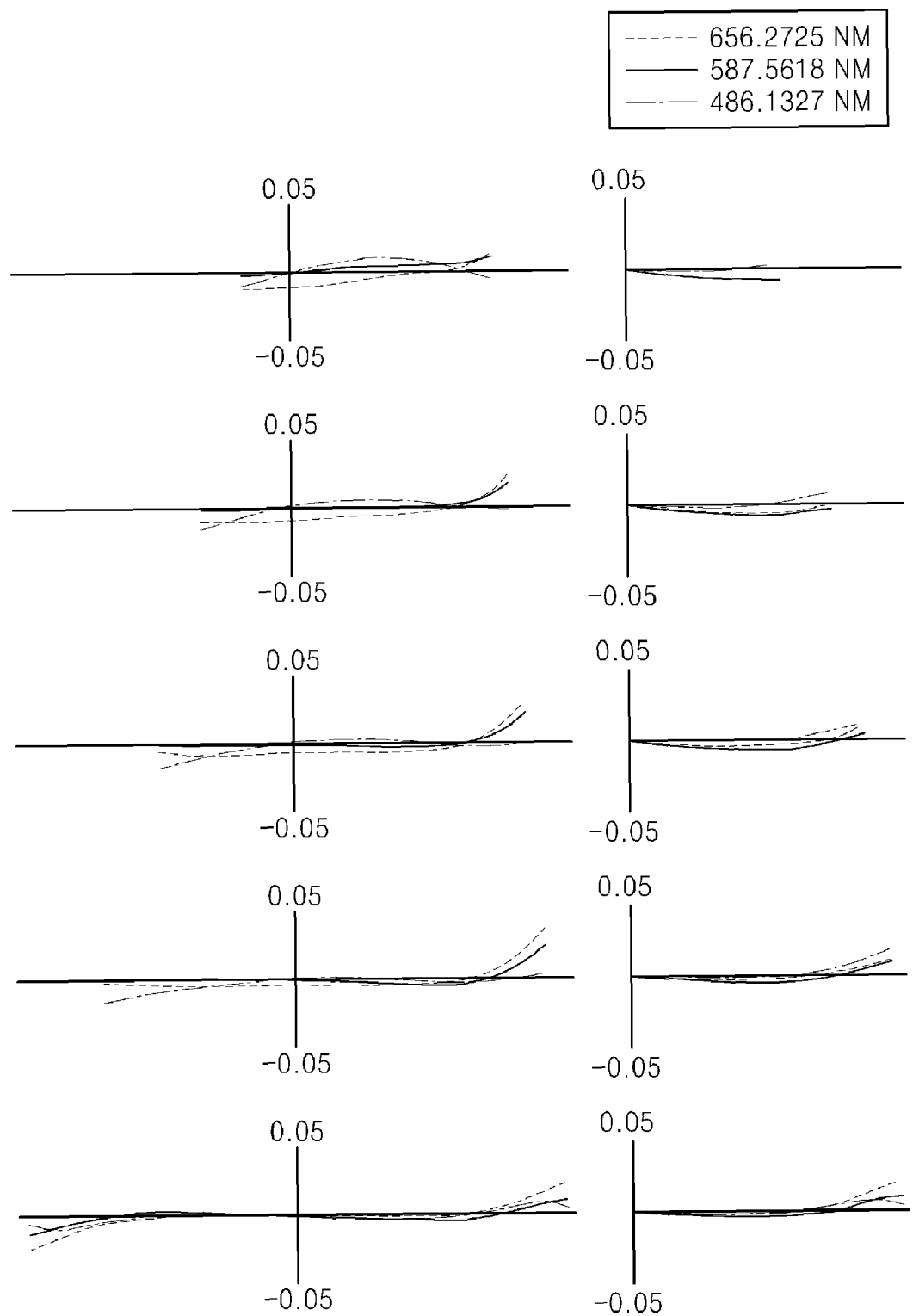
Figure 15C:
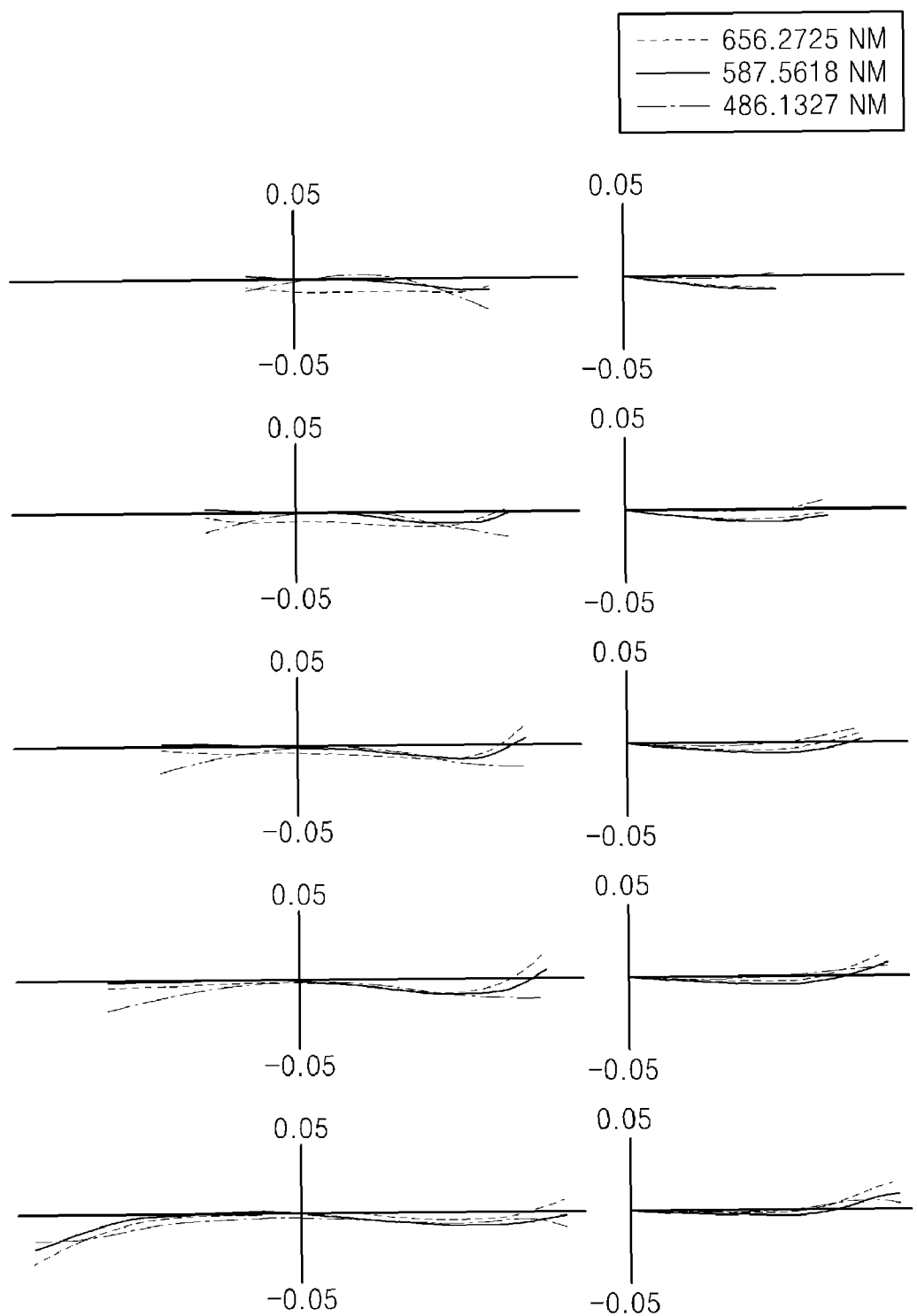

FIGS. 12A through 12C illustrate spherical aberration at a wide angle position, astigmatic field curvature at an intermediate position, and distortion at a telephoto position of the zoom lens according to the embodiment illustrated in FIG. 11. FIGS. 13A through 13C illustrate ray fans obtained at the wide angle position of the zoom lens according to the embodiment illustrated in FIG. 11. FIGS. 14A through 14C illustrate ray fans obtained at the intermediate position of the zoom lens according to the embodiment illustrated in FIG. 11. FIGS. 15A through 15C illustrate ray fans obtained at the telephoto position of the zoom lens according to the embodiment illustrated in FIG. 11.

FOURTH EMBODIMENT

FIG. 16 illustrates a wide angle position, an intermediate position, and a telephoto position of a zoom lens according to another embodiment of the present invention.

f: 72.2-203.7 mm, Fno: 2.9-2.9, 2ω: 34.36°-11.80°

| Lens surface | R | Dn | nd | vd |
|---|---|---|---|---|
| OBJ | ∞ | | | |
| S1 | 209.823 | 2.20 | 1.7725 | 49.6 |
| S2 | 66.629 | 12.00 | 1.48749 | 70.4 |
| S3 | 1132.635 | 0.100 | | |
| S4 | 67.779 | 9.00 | 1.497 | 81.6 |
| S5 | 191.831 | D1 | | |
| S6 | 75.511 | 2.50 | 1.7552 | 27.5 |
| S7 | 54.624 | 1.842 | | |
| S8 | 63.569 | 11.50 | 1.62299 | 58.1 |
| S9 | ∞ | D2 | | |
| S10 | ∞ | 1.50 | 1.72825 | 28.3 |
| S11 | 30.454 | 6.933 | | |
| S12 | −88.565 | 1.50 | 1.48749 | 70.4 |
| S13 | 35.700 | 6.50 | 1.92286 | 20.9 |
| S14 | ∞ | 2.70 | | |
| S15 | −65.715 | 1.50 | 1.883 | 40.8 |
| S16 | ∞ | D3 | | |
| S17 | ∞ | 4.00 | 1.7433 | 49.2 |
| S18 | −93.480 | 0.100 | | |
| S19 | 89.639 | 8.00 | 1.48749 | 70.4 |
| S20 | −62.002 | 2.00 | 1.80518 | 25.5 |
| S21 | −184.351 | D4 | | |
| ST | ∞ | 1.00 | | |
| S23 | 43.529 | 2.00 | 1.84666 | 23.8 |
| S24 | 26.385 | 7.68 | 1.7725 | 49.6 |
| S25 | 48.636 | 15.534 | | |
| S26 | 67.884 | 9.00 | 1.84666 | 23.8 |
| S27 | −33.992 | 1.50 | 1.7495 | 35 |
| S28 | 25.363 | 5.00 | 1.84666 | 23.8 |
| S29 | 38.192 | 4.283 | | |
| S30 | 54.56 | 10.00 | 1.497 | 81.6 |
| S31 | −26.533 | 3.00 | 1.92286 | 20.9 |
| S32 | −66.250 | D5 | | |
| S33 | ∞ | 3.00 | 1.51872 | 64.2 |
| S34 | ∞ | D6 | | |
| IMAGE | ∞ | | | |

Variable distances in the zoom lens according to the embodiment illustrated in FIG. 16 are shown in the following.

| Variable distance | Wide angle position | Intermediate position | Telephoto position |
|---|---|---|---|
| D1 | 13.023 | 13.023 | 13.023 |
| D2 | 2.520 | 17.553 | 35.520 |
| D3 | 35.169 | 28.120 | 2.530 |
| D4 | 10.678 | 2.694 | 10.317 |
| D5 | 57.918 | 57.816 | 57.781 |
| D6 | 1.00 | 1.00 | 1.00 |

Figure 17A:
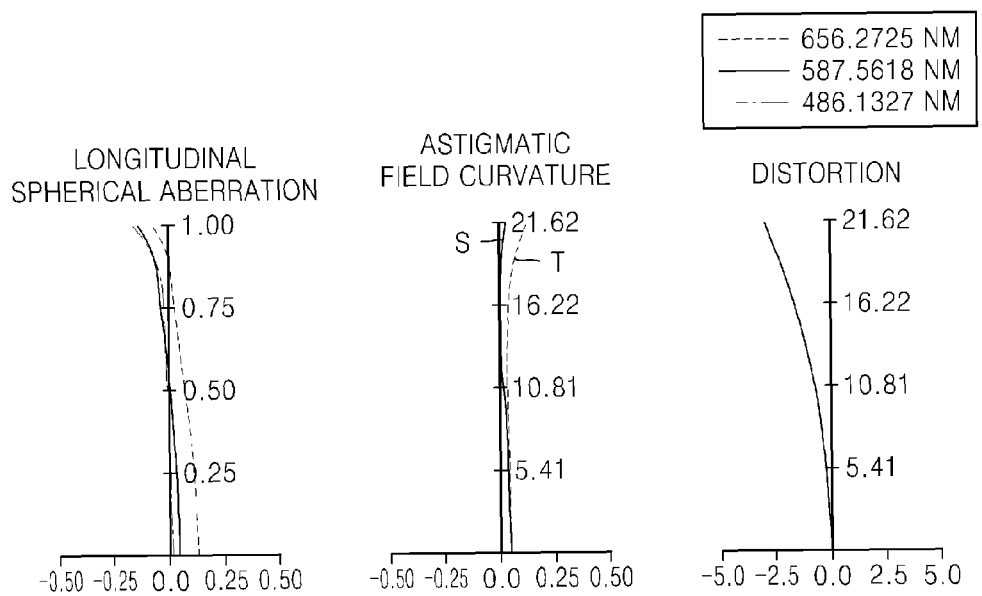
FIGS. 17A through 17C illustrate aberrations at a wide angle position, an intermediate position, and a telephoto position of the zoom lens according to the embodiment illustrated in FIG. 16.
Figure 17B:
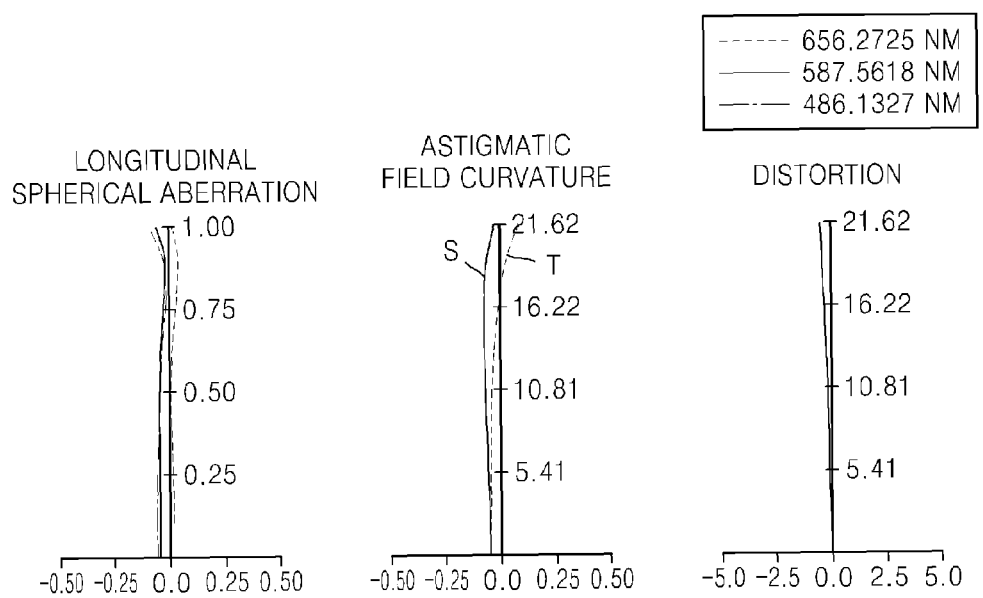
Figure 17C:
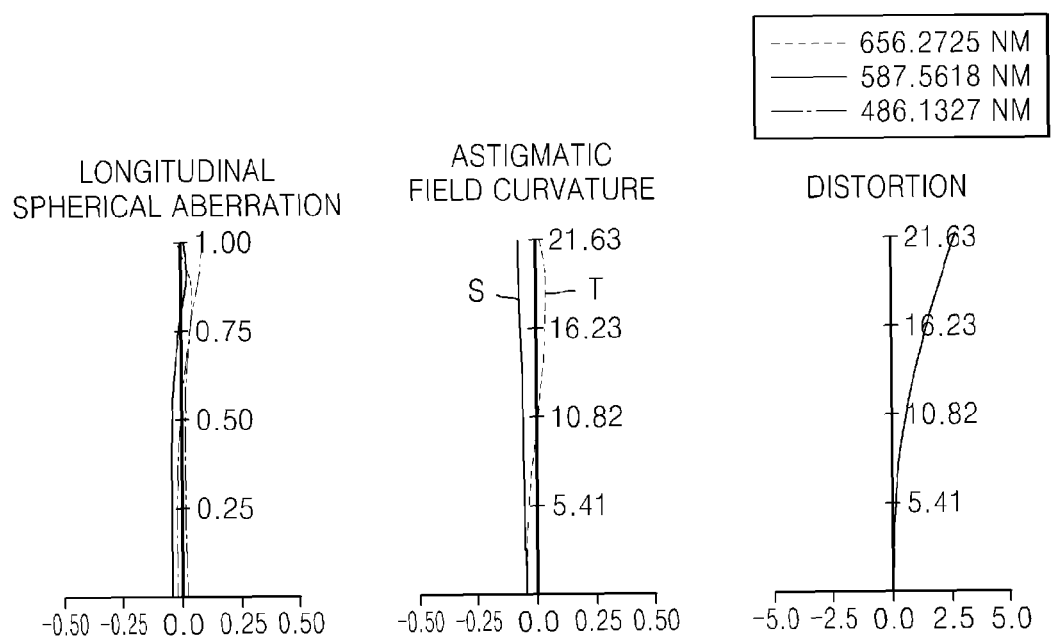
Figure 18A:
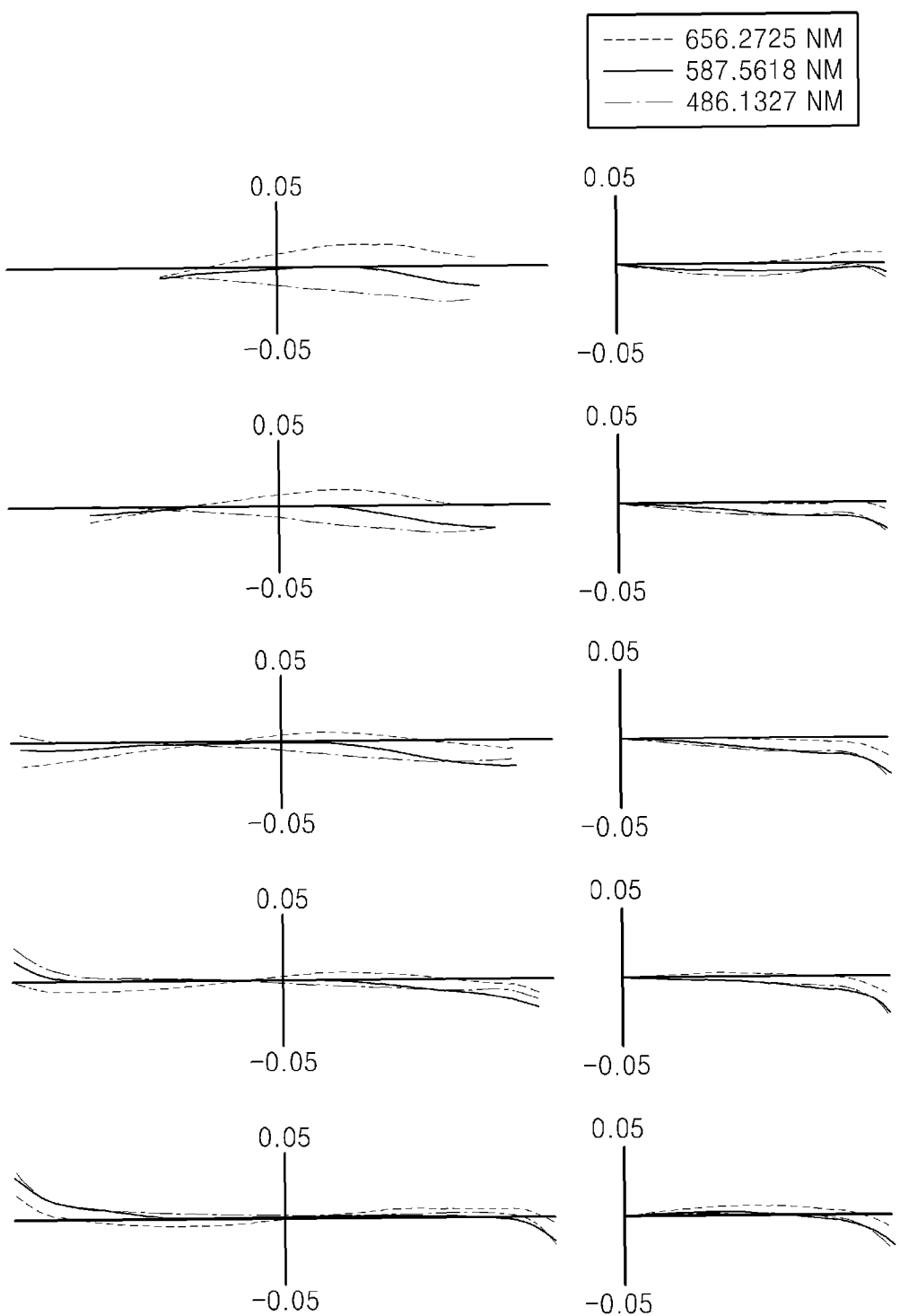
FIGS. 18A through 18C illustrate ray fans obtained by hand-shaking of a second lens group at the wide angle position of the zoom lens according to the embodiment illustrated in FIG. 16.
Figure 18B:
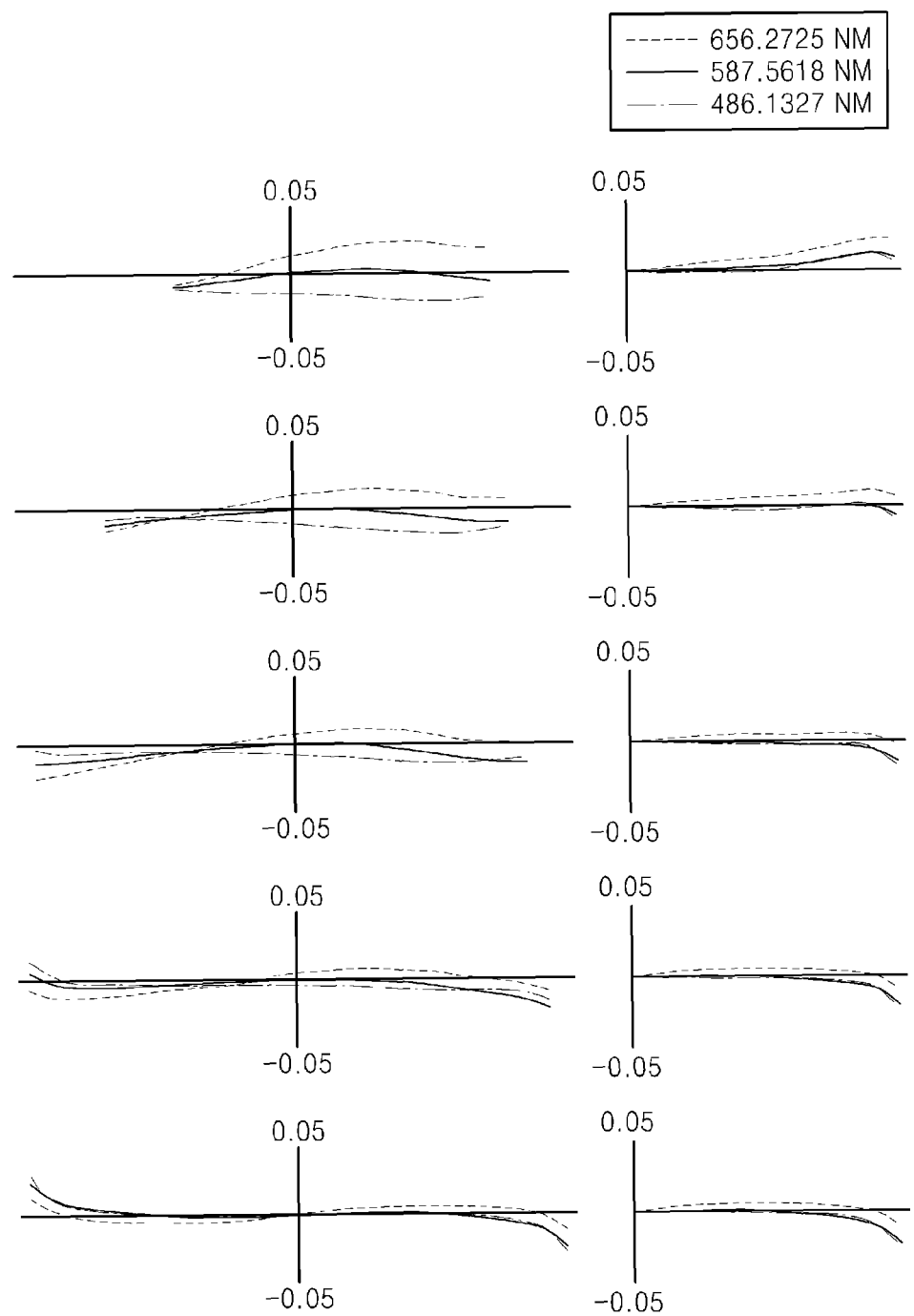
Figure 18C:
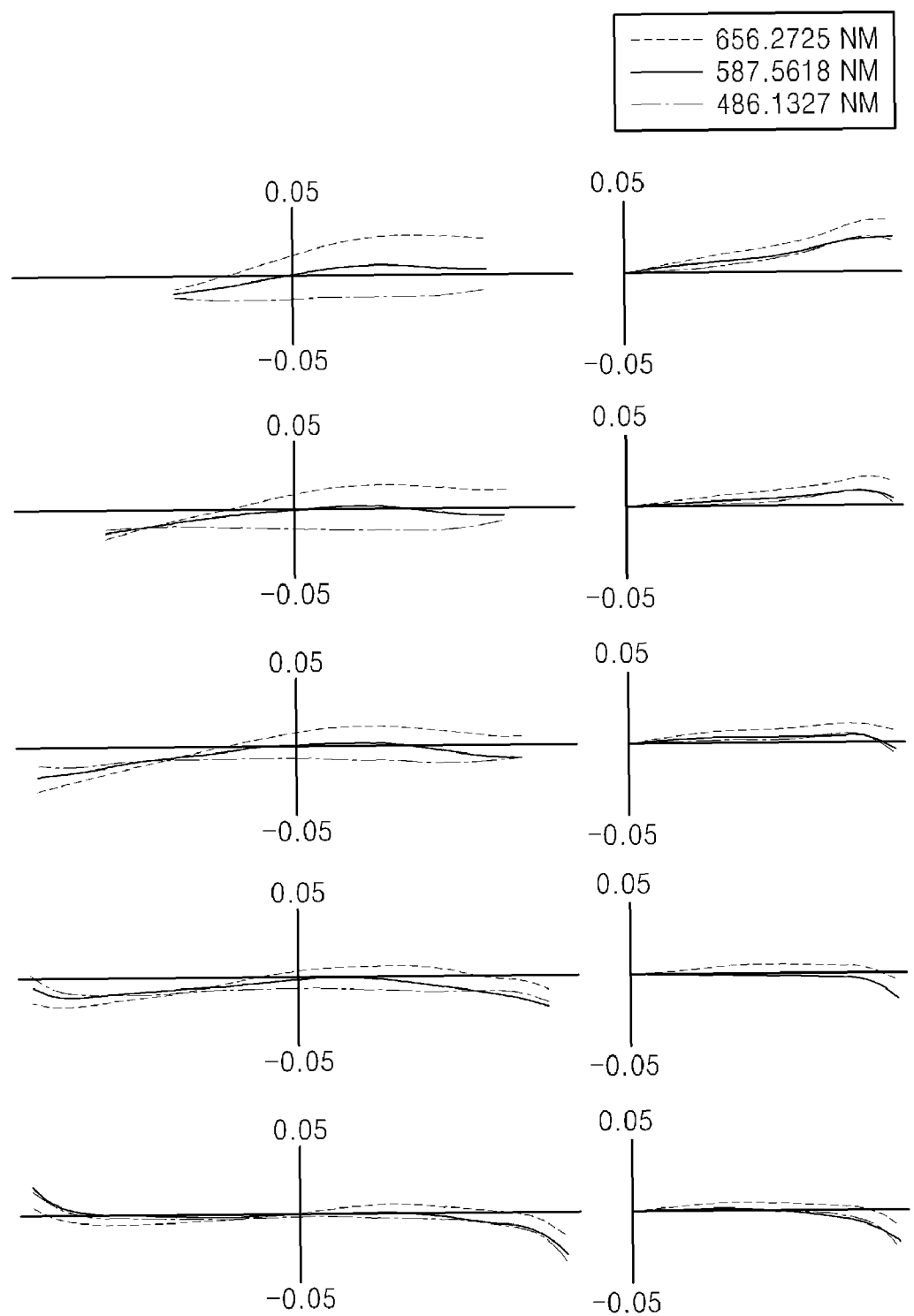
Figure 19A:
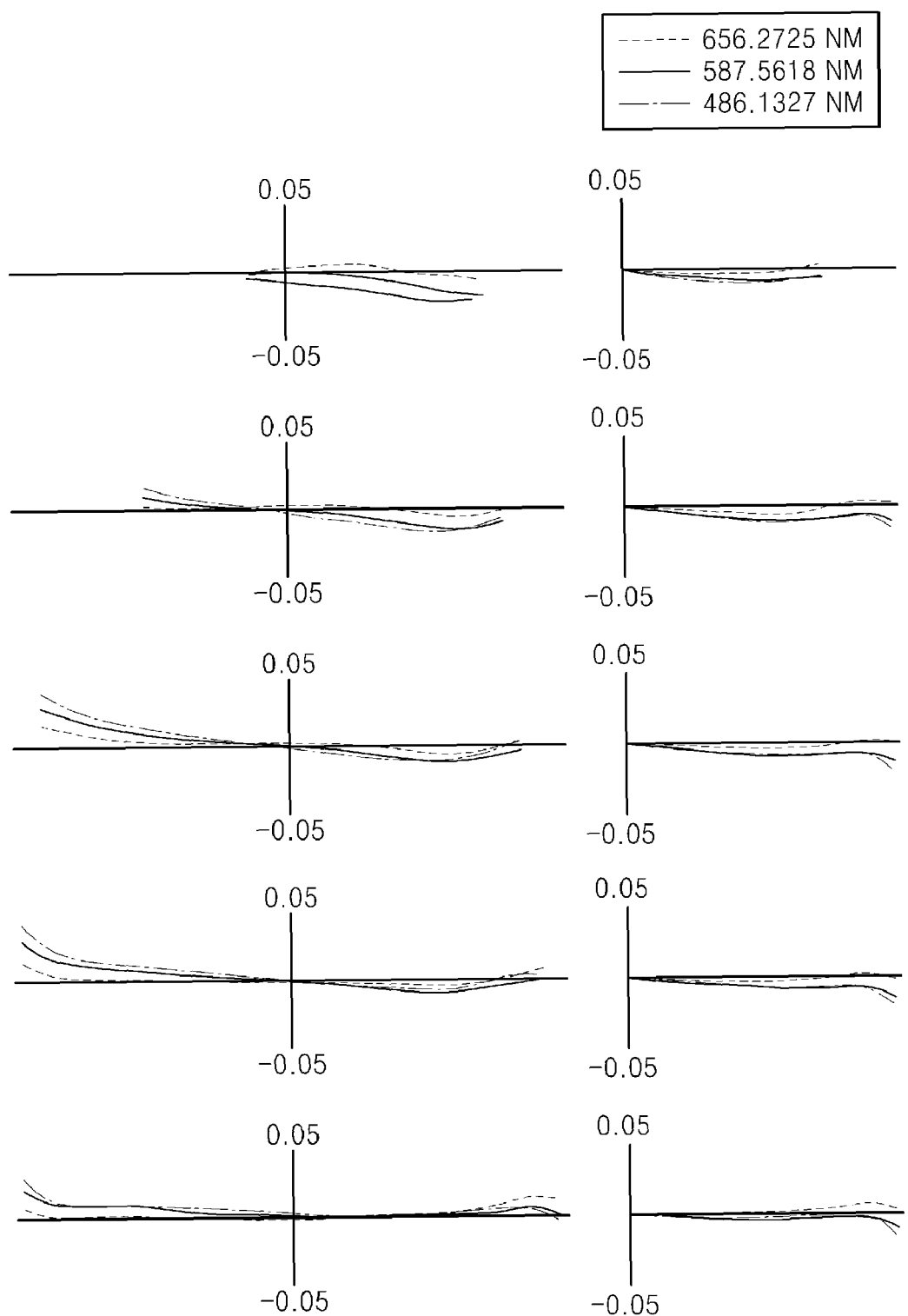
FIGS. 19A through 19C illustrate ray fans obtained by hand-shaking of the second lens group at the intermediate position of the zoom lens according to the embodiment illustrated in FIG. 16.
Figure 19B:
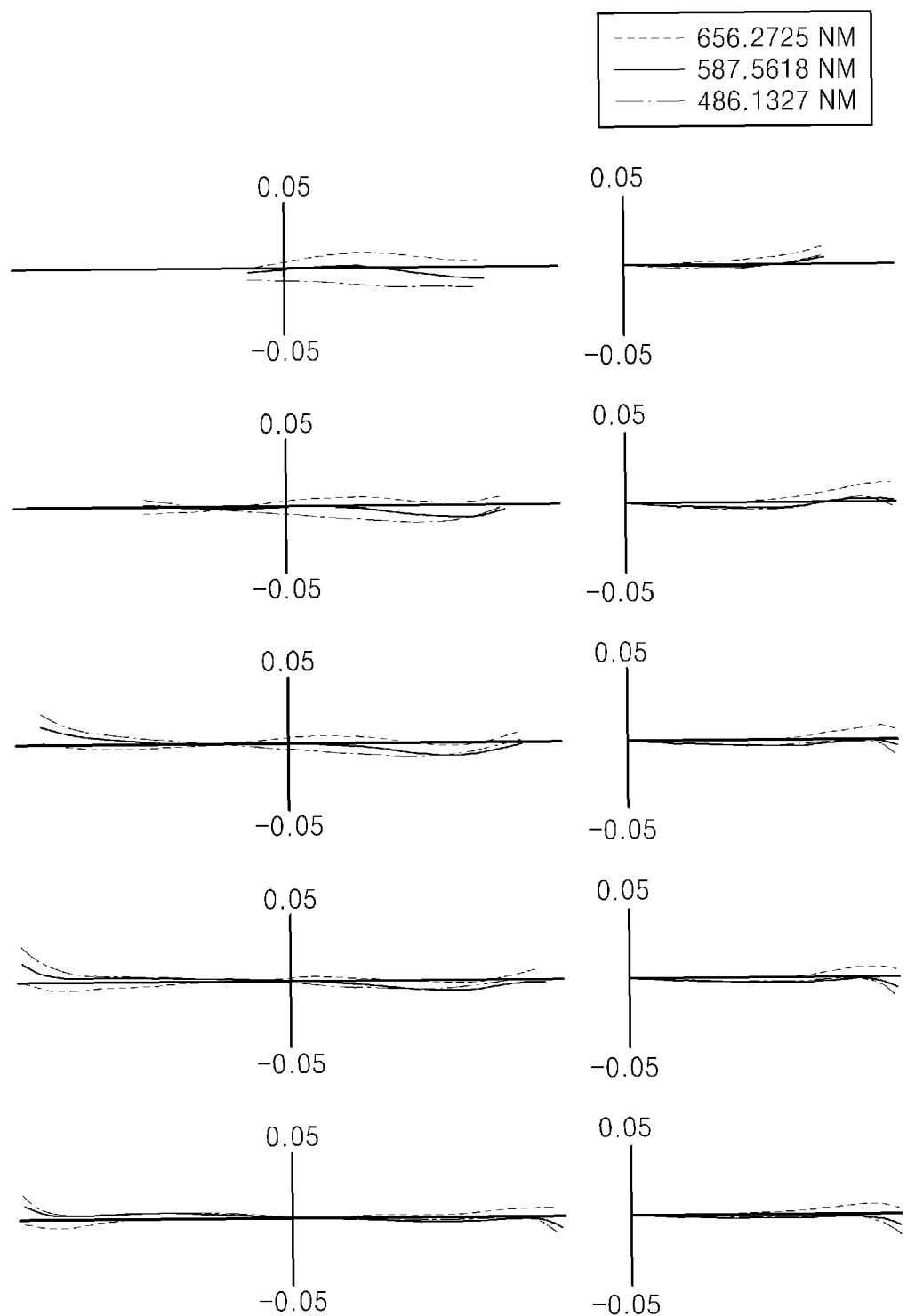
Figure 19C:
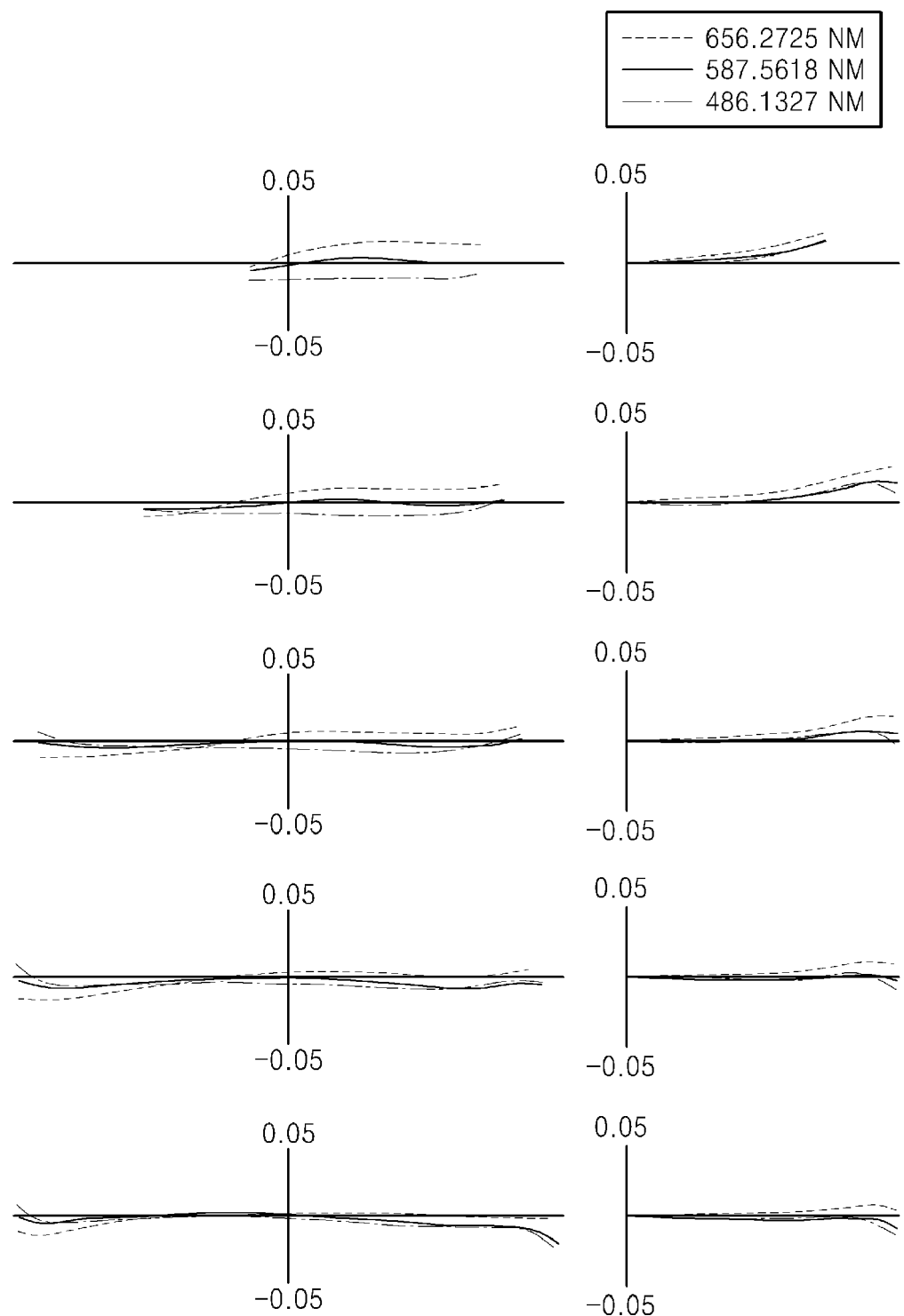
Figure 20A:
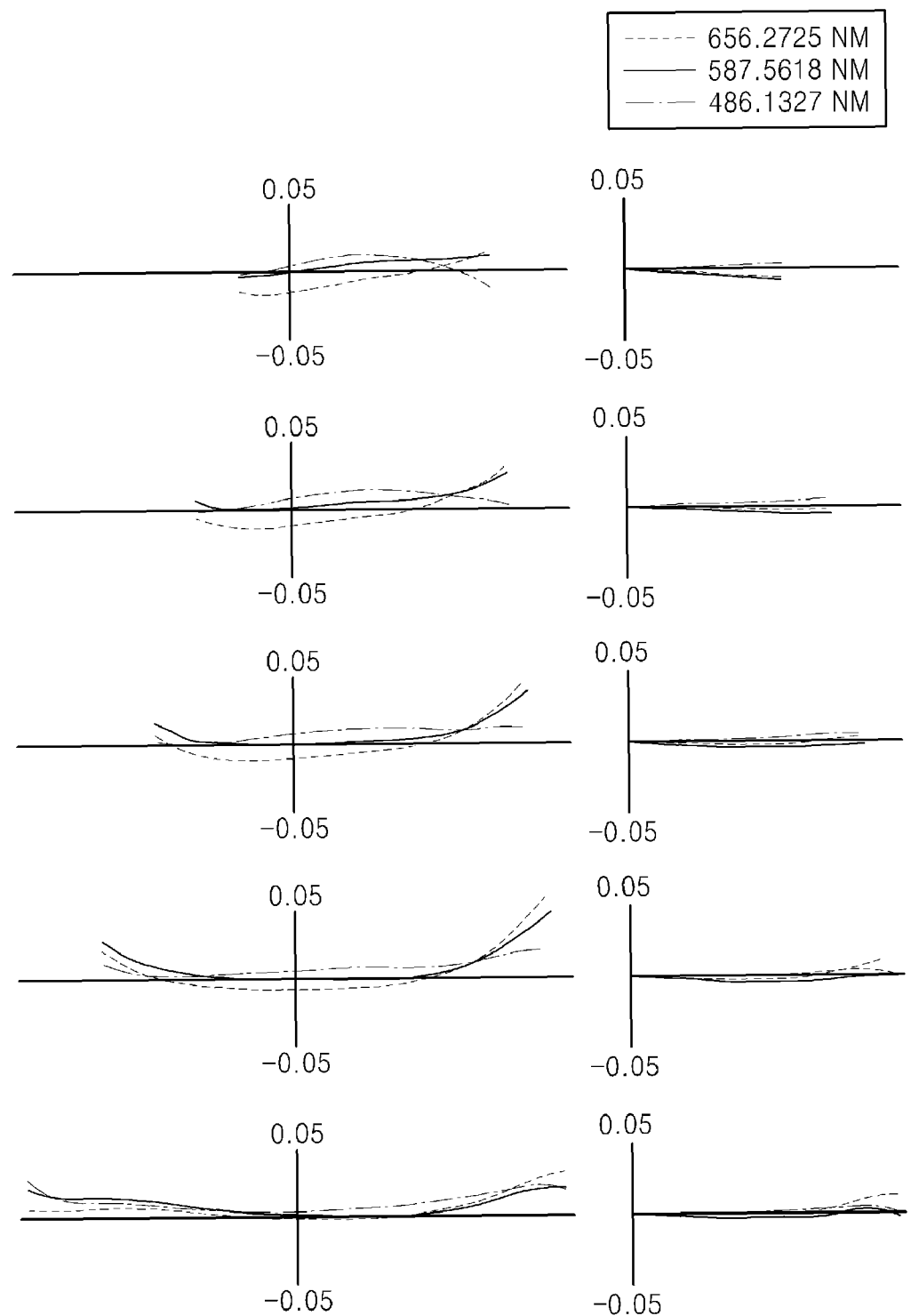
FIGS. 20A through 20C illustrate ray fans obtained by hand-shaking of the second lens group at the telephoto position of the zoom lens according to the embodiment illustrated in FIG. 16.
Figure 20B:
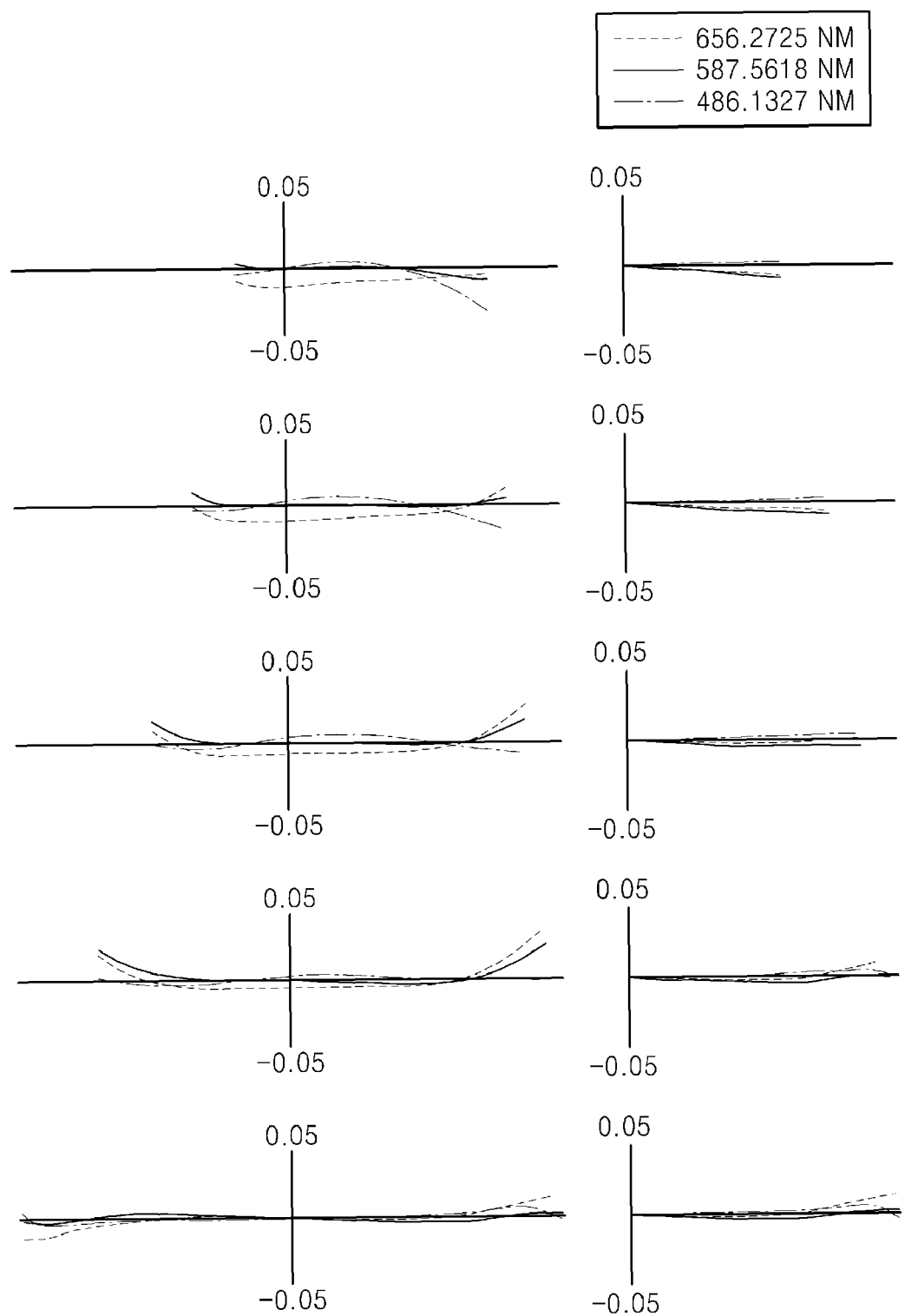
Figure 20C:
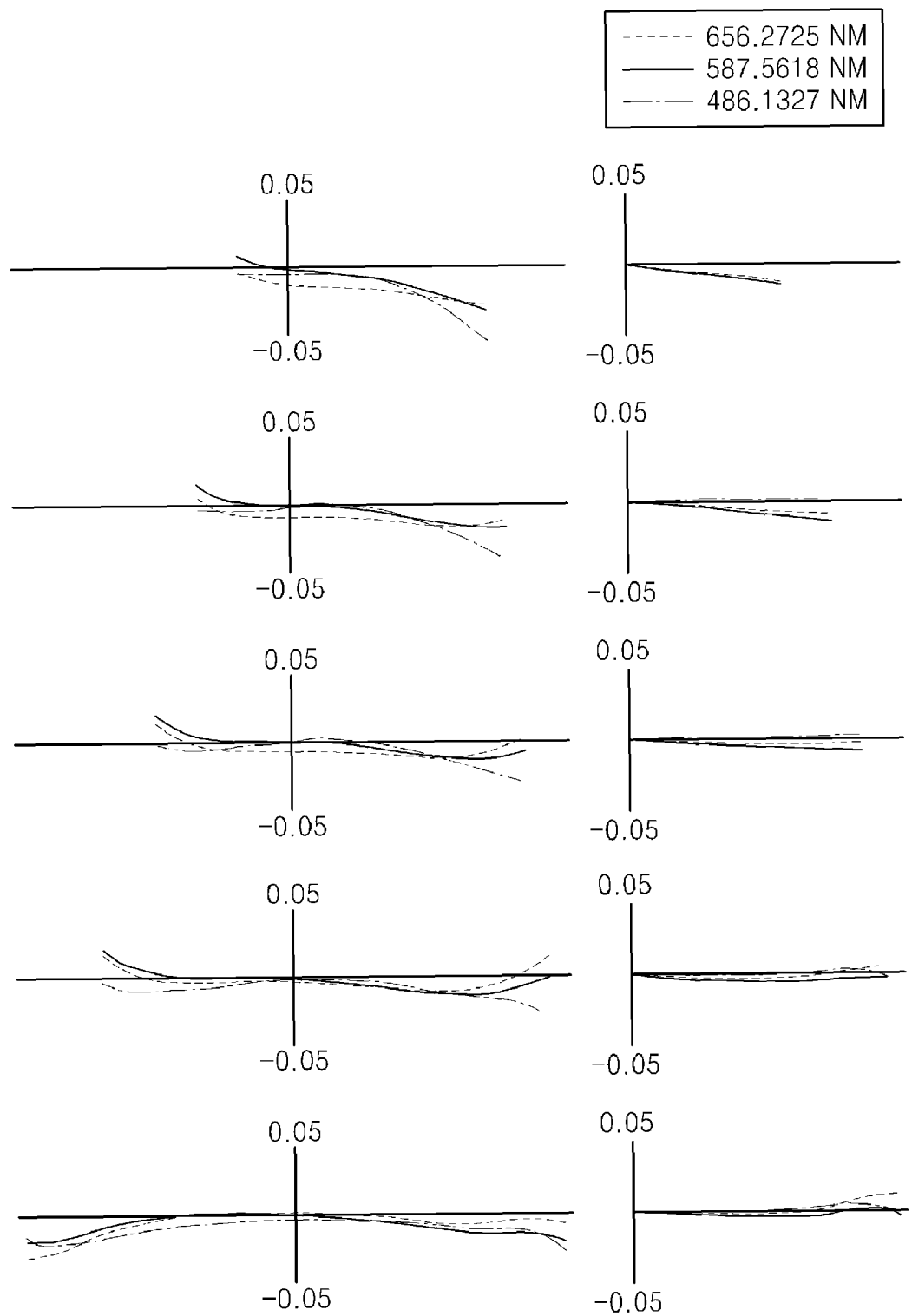

FIGS. 17A through 17C illustrate spherical aberration at a wide angle position, astigmatic field curvature at an intermediate position, and distortion at a telephoto position of the zoom lens according to the embodiment illustrated in FIG. 16. FIGS. 18A through 18C illustrate ray fans obtained at the wide angle position of the zoom lens according to the embodiment illustrated in FIG. 16. FIGS. 19A through 19C illustrate ray fans obtained at the intermediate position of the zoom lens according to the embodiment illustrated in FIG. 16. FIGS. 20A through 20C illustrate ray fans obtained at the telephoto position of the zoom lens according to the embodiment illustrated in FIG. 16.

Table 1 shows that each of the embodiments illustrated in FIGS. 1, 6, and 11 satisfies the conditions defined by Inequalities 1, 2, and 3.

TABLE 1

|  | First embodiment | Second embodiment | Third embodiment | Fourth embodiment |
|---|---|---|---|---|
| Inequality 1 | 1.37 | 1.31 | 1.47 | 1.59 |
| Inequality 2 | 0.66 | 0.64 | 0.66 | 0.73 |
| Inequality 3 | 28.5 | 28.5 | 36.6 | 30.6 |

As described above, the telephoto zoom lens according to the above-described embodiments of the present invention compensate for hand-shaking, are small in size, and have good optical performance.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A telephoto zoom lens comprising a first lens group having a positive refractive power, a second lens group having a negative refractive power, a third lens group having a positive refractive power, and a fourth lens group having a positive refractive power, which are sequentially arranged from an object side, wherein:

the first lens group comprises a front group which is fixed when focusing and has a positive refractive power, and a rear group which moves when focusing and has a positive refractive power;

the entire first lens group comprising the front and rear groups is fixed during zooming, and the second and third lens groups move during zooming; and the second lens group compensates for shaking of an image plane caused by hand-shaking, by moving in a direction perpendicular to an optical axis, and satisfies the following conditions:

$$1.2 < f1a/f1b < 1.8$$

$$25 < vmax - vmin < 40$$

where $f1a$ and $f1b$ denote the focal length of the front group of the first lens group and the focal length of the rear group of the first lens group, respectively and vmax denotes the largest Abbe number of the lenses included in the rear group of the first lens group, and vmin denotes the smallest Abbe number of the lenses included in the rear group of the first lens group.

2. The telephoto zoom lens of claim 1, wherein the second lens group comprises four lenses, among which the lenses positioned first and fourth from the object side have negative refractive powers and the lenses positioned second and third from the object side have positive refractive powers.

3. The telephoto zoom lens of claim 1, wherein the fourth lens group moves during zooming.

\* \* \* \* \*